(12) United States Patent
Stanford

(10) Patent No.: US 7,299,755 B2
(45) Date of Patent: *Nov. 27, 2007

(54) TABLE INCLUDING A BLOW-MOLDED PLASTIC TABLE TOP AND AN ATTACHED FRAME

(75) Inventor: Carl R. Stanford, Clinton, UT (US)

(73) Assignee: Lifetime Products, Inc., Clearfield, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/433,994

(22) Filed: May 15, 2007

(65) Prior Publication Data

US 2006/0266266 A1 Nov. 30, 2006

Related U.S. Application Data

(63) Continuation of application No. 11/130,743, filed on May 17, 2005, now Pat. No. 7,044,068, which is a continuation of application No. 10/427,193, filed on Apr. 30, 2003, now Pat. No. 6,895,872, which is a continuation of application No. 10/097,037, filed on Mar. 12, 2002, now Pat. No. 6,655,301, which is a continuation of application No. 09/635,303, filed on Aug. 9, 2000, now Pat. No. 6,431,092, which is a continuation-in-part of application No. 09/228,326, filed on Jan. 11, 1999, now Pat. No. 6,112,674, which is a continuation-in-part of application No. 29/095,372, filed on Oct. 21, 1998, now Pat. No. Des. 414,626.

(51) Int. Cl.
*A47B 3/00* (2006.01)

(52) U.S. Cl. ...................... 108/132; 108/129

(58) Field of Classification Search ................ 108/132, 108/129, 131, 115, 27, 161; 248/188.6
See application file for complete search history.

(56) References Cited

U.S. PATENT DOCUMENTS 236,197 A 1/1881 Valley (Continued)

FOREIGN PATENT DOCUMENTS

AU 223700 5/1958

(Continued)

OTHER PUBLICATIONS

Atlas Table ad sheet, Published by All-Luminum, Inc. 1988-1990.
All-Luminum Products, Inc., Gimbels, Folding Drop-leaf Table 36 "x 72", 1 page.

(Continued)

*Primary Examiner*—José V. Chen
(74) *Attorney, Agent, or Firm*—Workman Nydegger

(57) ABSTRACT

A pivotable folding utility table includes a table top having a pair of support pedestals pivotally attached thereto. A first pivotal support brace including a distal end and a proximal end attached to the first support pedestal. A second pivotal support brace including a distal end and a proximal end attached to the second support pedestal. The distal ends of the first and second pivotal support braces pivotally attached to a retaining assembly preferably mounted in relation to the table top. Specifically, the retaining assembly includes a cross-brace member operably disposed through openings formed in the distal ends of the first and second pivotal support braces, thus providing a pivotal engagement in relation to the table top. Alternatively, a second retaining assembly including a cross-brace member may be mounted in relation to the table top, wherein the distal end of the first pivotal support brace pivotally engages the first retaining member and the distal end of the second pivotal support brace pivotally engages the second retaining member. In addition, the first and second support pedestals may comprise at least one support leg, wherein each support leg of the first and second support pedestals are laterally offset from each other so as to permit an offset displacement of the support legs when the support pedestals are disposed in a collapsed position.

30 Claims, 5 Drawing Sheets

U.S. PATENT DOCUMENTS

| | | |
|---|---|---|
| 236,741 A | 1/1881 | Weaver |
| 769,354 A | 9/1904 | Nielsen |
| 1,063,642 A | 6/1913 | Birdsall |
| 1,266,929 A | 5/1918 | Enis |
| 1,272,187 A | 7/1918 | Basford |
| 1,296,336 A | 3/1919 | Stine |
| 1,351,013 A | 8/1920 | Stine |
| 1,514,418 A | 11/1924 | Battenfeld |
| 1,594,572 A | 8/1926 | Soltesz |
| 1,659,840 A | 2/1928 | Smith |
| 1,757,260 A | 5/1930 | Silverman |
| 1,765,766 A | 6/1930 | Lyon |
| 1,823,484 A | 9/1931 | Blumenthal |
| 1,836,934 A | 12/1931 | Morecroft |
| 1,836,943 A | 12/1931 | Temple |
| 1,888,117 A | 11/1932 | Fox |
| 1,956,946 A | 5/1934 | Duffy |
| 2,109,869 A | 3/1938 | Ross |
| 2,257,550 A | 9/1941 | Gay |
| 2,278,810 A | 4/1942 | Virtue |
| 2,326,461 A | 8/1943 | Howe |
| 2,411,658 A | 11/1946 | La Rue |
| 2,452,169 A | 10/1948 | Wells |
| 2,470,869 A | 5/1949 | Schmidt. |
| 2,512,473 A | 6/1950 | Alch |
| 2,522,642 A | 9/1950 | Schmidt |
| 2,524,198 A | 10/1950 | La Rue |
| 2,548,682 A | 4/1951 | Price |
| 2,558,465 A | 6/1951 | Seymour |
| 2,568,622 A | 9/1951 | Hagan |
| 2,579,934 A | 12/1951 | Krasney |
| 2,583,247 A | 1/1952 | Aja et al. |
| 2,621,710 A | 12/1952 | Miller |
| 2,647,562 A | 8/1953 | Hoffar |
| 2,661,792 A | 12/1953 | Lysaght |
| 2,670,031 A | 2/1954 | Melges |
| 2,689,158 A | 9/1954 | Mahr |
| 2,690,210 A | 9/1954 | Holick |
| 2,717,028 A | 9/1955 | Villemune |
| 2,717,631 A | 9/1955 | Howe |
| 2,722,971 A | 11/1955 | Gallagher et al. |
| 2,748,837 A | 6/1956 | Beller |
| 2,752,987 A | 7/1956 | Smithers |
| 2,756,082 A | 7/1956 | Pucci |
| 2,766,812 A | 10/1956 | Schrader |
| 2,771,937 A | 11/1956 | Wilson |
| 2,780,506 A | 2/1957 | Howe |
| 2,788,059 A | 4/1957 | Mackintosh |
| 2,800,379 A | 7/1957 | Smithers |
| 2,805,708 A | 8/1957 | Bohn |
| 2,811,197 A | 10/1957 | Nimmo |
| 2,811,400 A | 10/1957 | James |
| 2,825,390 A | 3/1958 | Post |
| 2,831,688 A | 4/1958 | Knox |
| 2,837,141 A | 6/1958 | Shore |
| 2,849,053 A | 8/1958 | Beller et al. |
| 2,878,589 A | 3/1959 | Howe et al. |
| 2,936,820 A | 5/1960 | Blink et al. |
| 2,939,516 A | 6/1960 | Drew |
| 2,959,209 A | 11/1960 | Lakin |
| 2,964,368 A | 12/1960 | Heyer |
| 2,978,754 A | 4/1961 | Wilson |
| 2,983,308 A | 5/1961 | Horowitz |
| 2,992,043 A | 7/1961 | Nelson |
| 2,999,729 A | 9/1961 | Semmelroth |
| 3,025,120 A | 3/1962 | Howe |
| 3,027,209 A | 3/1962 | Nielsen |
| 3,030,728 A | 4/1962 | Wesman |
| 3,041,775 A | 7/1962 | Brown, Jr. et al. |
| 3,079,197 A | 2/1963 | Mugler |
| 3,080,193 A | 3/1963 | Nimmo |
| 3,093,924 A | 6/1963 | Pompa |
| 3,096,866 A | 7/1963 | Glass |
| 3,101,062 A | 8/1963 | Kanzelberger |
| 3,112,954 A | 12/1963 | Kanitz |
| 3,141,424 A | 7/1964 | Seymour |
| 3,143,982 A | 8/1964 | Blink et al. |
| 3,144,236 A | 8/1964 | Clanin |
| 3,166,029 A | 1/1965 | Acton |
| 3,174,796 A | 3/1965 | Brown |
| 3,191,991 A | 6/1965 | Anderson et al. |
| 3,256,037 A | 6/1966 | Giambalvo |
| 3,259,426 A | 7/1966 | Shaw et al. |
| 3,267,886 A | 8/1966 | Glass |
| 3,273,936 A | 9/1966 | Deavers |
| 3,276,815 A | 10/1966 | Cardy |
| 3,337,262 A | 8/1967 | Katzfey et al. |
| 3,349,728 A | 10/1967 | Barecki et al. |
| 3,353,867 A | 11/1967 | Anderson |
| 3,357,729 A | 12/1967 | Krueger |
| 3,410,232 A | 11/1968 | Krueger |
| 3,429,283 A | 2/1969 | Uhor |
| 3,439,634 A | 4/1969 | Bender |
| 3,545,738 A | 12/1970 | Stagg |
| 3,574,393 A | 4/1971 | Hughes |
| 3,580,632 A | 5/1971 | Seymour |
| 3,650,560 A | 3/1972 | Wohlk |
| 3,672,719 A | 6/1972 | Haukedahl |
| 3,692,358 A | 9/1972 | Sung |
| 3,731,971 A | 5/1973 | Sjogren |
| 3,762,626 A | 10/1973 | Dorsey |
| 3,765,719 A | 10/1973 | Silver |
| 3,769,920 A | 11/1973 | Weiss |
| 3,788,696 A | 1/1974 | Loewen |
| 3,797,884 A | 3/1974 | Gutierrez |
| 3,857,343 A | 12/1974 | Greenberg |
| 3,885,829 A | 5/1975 | Haeger |
| 3,893,400 A | 7/1975 | Grant |
| 3,905,478 A | 9/1975 | Peterson et al. |
| 3,922,408 A | 11/1975 | Smith |
| 3,960,354 A | 6/1976 | Simikoski |
| 3,994,527 A | 11/1976 | Nikitits et al. |
| 4,040,658 A | 8/1977 | Mayol |
| 4,043,277 A | 8/1977 | Wallace |
| 4,047,754 A | 9/1977 | Cathey |
| 4,052,100 A | 10/1977 | Nikitits et al. |
| 4,060,275 A | 11/1977 | Hansen |
| 4,064,812 A | 12/1977 | Commanda |
| 4,064,815 A | 12/1977 | Baum |
| 4,070,057 A | 1/1978 | Jones |
| 4,072,231 A | 2/1978 | Helms |
| 4,111,482 A | 9/1978 | Jones |
| 4,131,311 A | 12/1978 | Nikitits et al. |
| 4,157,089 A | 6/1979 | Loughrey |
| 4,191,111 A | 3/1980 | Emmert |
| RE30,274 E | 5/1980 | Bolon et al. |
| 4,249,773 A | 2/1981 | Giambalvo |
| 4,289,350 A | 9/1981 | Thomas et al. |
| 4,330,151 A | 5/1982 | Healey |
| 4,382,627 A | 5/1983 | Dean |
| 4,415,199 A | 11/1983 | Wright |
| 4,438,603 A | 3/1984 | Durkan, Jr. |
| 4,462,636 A | 7/1984 | Markson |
| 4,471,969 A | 9/1984 | Zabala et al. |
| 4,487,328 A | 12/1984 | Wilcox et al. |
| 4,489,661 A | 12/1984 | Fitzgerald |
| 4,537,443 A | 8/1985 | Bray |
| 4,538,526 A | 9/1985 | Seeley |
| 4,557,200 A | 12/1985 | Geschwender |
| 4,572,574 A | 2/1986 | Fischhaber et al. |
| 4,596,196 A | 6/1986 | Gunter et al. |
| 4,606,575 A | 8/1986 | Kodet |
| 4,648,652 A | 3/1987 | Van Kuren |
| 4,653,804 A | 3/1987 | Yoo et al. |

| | | | | | | |
|---|---|---|---|---|---|---|
| 4,700,987 A | 10/1987 | Sraka et al. | | D419,332 S | 1/2000 | Collins et al. |
| 4,740,032 A | 4/1988 | Olsen et al. | | D420,527 S | 2/2000 | Pinch et al. |
| 4,744,309 A | 5/1988 | Kiesel et al. | | 6,032,585 A | 3/2000 | Pinch |
| 4,762,321 A | 8/1988 | Chang | | D423,258 S | 4/2000 | Pinch |
| 4,762,379 A | 8/1988 | Beam et al. | | 6,058,853 A * | 5/2000 | Pinch .................. 108/129 |
| 4,815,394 A | 3/1989 | Ettlinger et al. | | 6,076,472 A | 6/2000 | Lloyd |
| 4,817,902 A | 4/1989 | Mason | | 6,086,148 A | 7/2000 | Gatto et al. |
| 4,822,066 A | 4/1989 | Rehrig | | 6,109,687 A | 8/2000 | Nye et al. |
| 4,826,244 A | 5/1989 | Choi | | 6,112,674 A | 9/2000 | Stanford |
| 4,834,450 A | 5/1989 | Stickler | | D442,788 S | 5/2001 | Nye et al. |
| 4,841,877 A | 6/1989 | Virtue | | 6,334,400 B1 | 1/2002 | Nien |
| 4,841,879 A | 6/1989 | Ferguson | | 6,347,831 B1 | 2/2002 | Nye et al. |
| 4,846,076 A | 7/1989 | Menges, Sr. et al. | | 6,371,034 B1 * | 4/2002 | Simpson et al. ............ 108/129 |
| 4,864,941 A | 9/1989 | Goulter | | 6,431,092 B1 | 8/2002 | Stanford |
| 4,883,314 A | 11/1989 | Sakong | | 6,443,521 B1 | 9/2002 | Nye et al. |
| 4,903,686 A | 2/1990 | Jennings | | 6,530,331 B2 | 3/2003 | Stanford |
| 4,951,576 A | 8/1990 | Cobos et al. | | 6,550,404 B2 | 4/2003 | Stanford |
| 4,960,303 A | 10/1990 | York | | 6,622,644 B2 * | 9/2003 | Buono .................. 108/132 |
| 4,998,395 A | 3/1991 | Bezner | | 6,651,568 B1 * | 11/2003 | Buono .................. 108/127 |
| 5,007,673 A | 4/1991 | Cheng | | 6,655,301 B2 | 12/2003 | Stanford |
| 5,009,170 A | 4/1991 | Spehar | | 6,823,806 B1 * | 11/2004 | Buono .................. 108/132 |
| 5,014,628 A | 5/1991 | Roberts | | 6,832,563 B2 | 12/2004 | Stanford |
| 5,018,785 A | 5/1991 | Monson et al. | | 6,848,370 B1 | 2/2005 | Stanford |
| 5,029,938 A | 7/1991 | Song | | 6,895,872 B2 | 5/2005 | Stanford |
| 5,060,902 A | 10/1991 | Hartman | | 6,915,748 B2 | 7/2005 | Stanford |
| 5,070,664 A | 12/1991 | Groh et al. | | 6,931,999 B2 * | 8/2005 | Stanford .................. 108/132 |
| 5,080,250 A | 1/1992 | Dickinson et al. | | 7,044,068 B2 * | 5/2006 | Stanford .................. 108/132 |
| 5,104,607 A | 4/1992 | Driska | | 2003/0127028 A1 | 7/2003 | Baik et al. |
| 5,109,778 A | 5/1992 | Berkowitz et al. | | 2003/0177962 A1 | 9/2003 | Stanford |
| 5,149,575 A | 9/1992 | Soifer | | 2003/0233967 A1 | 12/2003 | Lin |
| 5,208,084 A | 5/1993 | Rutz | | 2004/0099189 A1 | 5/2004 | Stanford |
| 5,240,307 A | 8/1993 | Jones et al. | | 2004/0187747 A1 | 9/2004 | Shenghao et al. |
| 5,271,338 A | 12/1993 | Bonham | | 2004/0187748 A1 | 9/2004 | Shenghao et al. |
| 5,279,233 A | 1/1994 | Cox | | 2004/0194675 A1 | 10/2004 | Shenghao et al. |
| 5,284,100 A | 2/1994 | Thorn | | 2004/0237856 A1 | 12/2004 | Shenghao et al. |
| 5,314,231 A | 5/1994 | Otterbacher | | 2004/0244656 A1 | 12/2004 | Shenghao et al. |
| 5,323,713 A | 6/1994 | Luyk et al. | | 2005/0045075 A1 | 3/2005 | Stanford |
| 5,325,793 A | 7/1994 | Martin | | 2005/0045076 A1 | 3/2005 | Stanford |
| 5,335,594 A | 8/1994 | Karlyn et al. | | | | |
| D350,862 S | 9/1994 | Beller | | FOREIGN PATENT DOCUMENTS | | |
| 5,357,872 A | 10/1994 | Wilmore | | | | |
| 5,377,601 A | 1/1995 | Cashen | | BE | 650758 | 11/1964 |
| 5,394,808 A | 3/1995 | Dutro et al. | | CA | 2166651 | 7/1996 |
| 5,409,245 A | 4/1995 | Kern et al. | | DE | 341007 | 5/1920 |
| 5,411,314 A | 5/1995 | Wallace | | DE | 3705566 | 9/1988 |
| 5,421,272 A | 6/1995 | Wilmore | | EP | 0572331 | 12/1933 |
| 5,440,857 A | 8/1995 | Shanok et al. | | FR | 2553644 | 4/1985 |
| 5,443,020 A | 8/1995 | Price | | FR | 2637474 | 4/1990 |
| 5,478,040 A | 12/1995 | Rellinger et al. | | GB | 10007 | 5/1908 |
| 5,483,901 A | 1/1996 | Tisbo et al. | | GB | 1457271 | 12/1976 |
| 5,488,926 A | 2/1996 | Hunt | | GB | 1595210 | 8/1981 |
| 5,505,142 A | 4/1996 | Fink | | JP | 07171877 | 7/1995 |
| 5,536,552 A | 7/1996 | Scripsick | | JP | 08108464 | 4/1996 |
| 5,622,120 A | 4/1997 | Yeh | | JP | 09065934 | 3/1997 |
| 5,623,882 A | 4/1997 | Price | | JP | H10-75825 | 3/1998 |
| 5,626,339 A | 5/1997 | Schickert et al. | | JP | 10192060 | 7/1998 |
| 5,638,761 A | 6/1997 | Berkowitz et al. | | TW | 320006 | 3/1997 |
| 5,662,303 A | 9/1997 | Rellinger et al. | | WO | WO 94/12075 | 6/1994 |
| 5,678,491 A | 10/1997 | Price et al. | | WO | WO95/10204 | 4/1995 |
| 5,694,865 A | 12/1997 | Raab | | | | |
| 5,730,066 A | 3/1998 | Auten et al. | | OTHER PUBLICATIONS | | |
| 5,732,637 A | 3/1998 | Raab | | | | |
| 5,860,367 A | 1/1999 | Riegel et al. | | All-Luminum Products, Inc., Lightweight Centerfold Banquet Table, 1 page. | | |
| D405,631 S | 2/1999 | Burdick et al. | | | | |
| 5,865,128 A | 2/1999 | Tarnay | | All-Luminum Products, Inc., Fine Folding Furniture, 1 page. | | |
| 5,868,081 A | 2/1999 | Raab | | All-Luminum Products, Inc., 36 Position Leisure Lounge, 1 page. | | |
| 5,909,021 A | 6/1999 | Duffy | | All-Luminum Products, Inc., Formwood, Sew Tables/Atlas Legs/Adjust-a-Table, 1 page. | | |
| 5,921,623 A | 7/1999 | Nye et al. | | | | |
| 5,947,037 A | 9/1999 | Hornberger et al. | | All-Luminum Products, Inc., Beauty-Fold Tables, 1 page. | | |
| D414,626 S | 10/1999 | Collins et al. | | All-Luminum Products, Inc., Spring Sun-Cot, 1 page. | | |
| 5,983,807 A | 11/1999 | Tarnay et al. | | All-Luminum Products, Inc., Alumilite Tables, 2 pages, 1975. | | |
| 5,984,047 A | 11/1999 | Rogers | | All-Luminum Products, Inc., All-Luminum . . . The Action Line Manufacturers of Fine Folding Furniture, 6 pages. | | |
| 6,000,345 A | 12/1999 | Gillotti | | | | |

All-Luminum Products, Inc., Advertising Art & Copy, 6 pages.
All-Luminum Products, Inc., Tables, 1 page.
All-Luminum Products, Inc., Casual Furniture Classics, 2 pages.
All-Luminum Products, Inc., Marshall Field & Company, Adjustable, 1 page.
All-Luminum Products, Inc., Rest Assured on All-Luminum Folding Beds, 1 page.
All-Luminum Products, Inc., Tables/Cot, 1 page.
All-Luminum Products, Inc., Round Table, 1 page.
All-Luminum Products, Inc. Beauty-Fold Casual Furniture, 8 pages.
Windsor Metal Products, 5 pages.
All-Luminum Products, Inc., Design-A-Wall, 1 page.
All-Luminum Products, Inc., Model No. PT 2760, 1 page.
All-Luminum Products, Inc., Adjust-A Bed, 1 page.
All-Luminum Products, Inc., Atlas Folding Table, 2 pages.
All-Luminum Products, Inc., Fanta Furniture/Pro-Action Tennis Table, 2 page.
All-Luminum Products, Inc., Ambassador Planned Profit Program, 8 pages.
All-Luminum Products, Inc., Rollaway Beds, 1 page.
All-Luminum Products, Inc., Atlas Chromite-Finish Folding Legs, 1 page.
All-Luminum Products, Inc., Fanta Furniture, 1 page.
All-luminum Products, Inc. All-Luminum Products Casual Furniture, 11 pages, Oct. 1, 1988
All-Luminum Products, Inc., Cutting table, 6 pages, Sep. 6, 200.
All-Luminum Products, Inc., 27 x 8 Main Table and Parts, 8 pages, Jul. 6, 2005.

\* cited by examiner

TABLE INCLUDING A BLOW-MOLDED PLASTIC TABLE TOP AND AN ATTACHED FRAME

CROSS-REFERENCE TO RELATED APPLICATIONS

The application is a continuation of U.S. patent application Ser. No. 11/130,743, entitled TABLE INCLUDING A BLOW-MOLDED PLASTIC TABLE TOP AND AN ATTACHED FRAME, which was filed on May 17, 2005 now U.S. Pat. No. 7,044,068; which is a continuation of U.S. patent application Ser. No. 10/427,193, entitled PORTABLE FOLDING UTILITY TABLE WITH FRAME CONNECTED TO INTEGRAL LIP, which was filed on Apr. 30, 2003, now U.S. Pat. No. 6,895,872; which is a continuation of U.S. patent application Ser. No. 10/097,037, entitled PORTABLE FOLDING UTILITY TABLE WITH FRAME CONNECTED TO INTEGRAL LIP, which was filed Mar. 12, 2002, now U.S. Pat. No. 6,655,301; which is a continuation of U.S. patent application Ser. No. 09/635,303, entitled PORTABLE FOLDING UTILITY TABLE WITH CENTER SUPPORT ASSEMBLY, filed Aug. 9, 2000, now U.S. Pat. No. 6,431,092; which is a continuation-in-part of U.S. patent application Ser. No. 09/228,326, filed Jan. 11, 1999, entitled PORTABLE FOLDING UTILITY TABLE WITH CENTER SUPPORT ASSEMBLY, now U.S. Pat. No. 6,112,674; which is a continuation-in-part of U.S. patent application Ser. No. 29/095,372, entitled UTILITY TABLE, filed Oct. 21, 1998, now U.S. Pat. No. Des. 414,626; all of which are incorporated herein by reference in their entireties.

BACKGROUND OF THE INVENTION

1. The Field of the Invention

The present invention is related to a utility table, and more particularly, to a portable folding utility table having one or more center support assemblies and off-set support legs that selectively support the utility table above a surface.

2. Technical Background

Portable folding utility tables are indispensable for groups or organizations that have limited floor space usable for multiple purposes. For example, foldable utility tables can be placed in a pre-determined configuration to meet the space requirements of a school gymnasium, a church multi-purpose room, or a hotel conference meeting room. Afterward, the tables can be neatly stored away and the conference or meeting room used for a different purpose. Thus, portable folding utility tables allow a group or organization to maximize the efficiency and utility of a particular space.

Foldable utility tables can also provide an immediate temporary work space in a garage, tool shed, and the like. The portability and foldability of these utility tables allows a user to conveniently set up, take down, and store the table whenever and wherever the user chooses.

A major drawback with many portable folding utility tables of the prior art, however, is their inherent size and bulkiness. Many such utility tables require two people to collapse and store the table after use. Moreover, some prior art portable folding utility tables are heavy enough to cause injury if dropped or mishandled. These unwieldy tables are usually made from hardwood, particle board, or similarly heavy materials. In an attempt to overcome this weight and bulkiness problem, some prior art portable utility tables are formed of lighter-weight materials. However, many of these lightweight utility tables generally lack the sturdiness of the heavier-weight prior art utility tables.

Another disadvantage to prior art utility tables is the means used for attaching the table support legs or two or more support pedestals to the underside of the table. As will be appreciated, prior art table support legs are typically attached to the table top using threaded screws or bolts that are drilled into the underside of the table top. This means of attachment may compromise the integrity of the table top thereby making it weaker at the point of attachment between the table support legs and the table top. Other attachment mechanisms may include a form of bonding the table support legs as support pedestals directly against the surface of the table top. Often, however, this means of attachment by bonding weakens the structural integrity of the table top. Thus, when the table support legs fail, a portion of the material forming the table top may pull away at the point of the bonded attachment thereby making the table costly, if not impossible to repair.

In an attempt to overcome the foregoing disadvantages, prior art utility tables were developed by those skilled in the art that are equipped with complex or heavy-duty attachment mechanisms that facilitate a secure attachment between the table support legs or the support pedestals and the table top. These types of attachment mechanisms, however, are normally heavier, more costly, more difficult to install, and typically require additional time to manufacture.

The previously stated disadvantages are compounded by the fact that many prior art utility tables incorporate a separate and distinct attachment mechanism for attaching each table support leg or pedestal to the table top. As appreciated, most existing portable folding utility tables have two sets of support legs or pedestal supports, one at each end of the table. Each of these supports is typically attached to the underside of the table top at two places or points of contact. Correspondingly, many of these types of utility tables have at least four separate points of attachment, each attachment between the support legs or pedestal supports facilitated by a separate attachment mechanism. One particular problem with utility tables having separate and distinct attachment mechanisms is that they are generally susceptible to bowing in the center of the table top under stress. This is especially true with larger banquet style tables.

Yet another drawback with many prior art utility tables is that the hard materials used to maintain a sufficient rigidity and sturdiness of the table top often have sharp edges which may be uncomfortable for the user to lean against or rest their arms upon. Further, these materials may also be susceptible to damage or degradation from the elements of nature.

In addition, smaller utility tables that are found in the prior art usually comprise shortened support legs that fail to provide sufficient height to the table top in relation to the underlying surface, thus these types of table are generally uncomfortable to users. In particular, when these prior art utility tables are configured in the folded position for storage, the table support legs are required to be short enough so not to interfere with each other when folded in a conventional fashion underneath the table top. Small folding utility tables of the prior art are also typically bulky when disposed in the folded position because complex and unwieldy mechanisms are generally required to accommodate the use of longer support legs that may be incorporated to overcome the inherent height deficit found in most smaller utility tables.

From the foregoing, it will be appreciated that it would be an advancement in the art to provide a portable folding utility table that is durable enough to withstand the increased wear and tear that portable utility tables are subjected to over long periods of time and sturdy enough to support varying sized loads that will be placed on the table, while at the same time being light-weight enough to be easily set up and taken down.

It would be another advancement in the art to provide a portable folding utility table having a leg or support pedestal attachment mechanism that does not involve a complex design, heavy duty attachment hardware, or need to be screwed, bolted, or bonded to the under side of the table top. It would be a further advancement in the art to provide a portable folding utility table that minimizes the points of attachment to the surface of the table top and facilitates attachment mechanisms that interrelate with each other to support the table top above an underlying surface.

Furthermore, it would be an advancement in the art to provide a portable folding utility table that may provide a smaller working surface than larger utility table, but that is comfortable to work at in relation to its height disposition and which is capable of withstanding the elements of nature.

Finally, it would be an advancement in the art to provide a portable folding utility table in which the support legs or pedestals, having a length greater than the corresponding length of the table top, can fold against the underside of the table top when disposed for storage without interfering with each other, so that smaller frames and table tops can be used that accommodate a sufficient height disposition in relation to the underlying support surface.

Such a portable folding utility table is disclosed and claimed herein.

BRIEF SUMMARY OF THE INVENTION

The present invention is directed to a novel portable folding utility table having a center support assembly. The utility table includes a table top supported by a pair of support pedestals. In one presently preferred embodiment, the table top includes a mounting surface and a working surface formed opposite the mounting surface. The working surface may be textured and may include an integral outer periphery, at least a portion of which is beveled to provide comfort to a user.

A first end of each support pedestal is preferably attached to the mounting surface of the table top. In one presently preferred embodiment, the support pedestals are pivotally attached to the mounting surface of the table top, to allow each support pedestal to be moved between a collapsed position and an extended position for supporting the table top above a surface. A securing member may also be attached to the mounting surface for releasably securing one or more support pedestals in the collapsed position.

Additionally, the utility table may include a first pivoting support brace attached to the first support pedestal at a proximal end and to the mounting surface at a distal end thereof. Similarly, a second pivoting support brace may be attached to the second support pedestal at a proximal end and to the mounting surface at a distal end thereof. In one presently preferred embodiment of the present invention, the distal ends of the first and second pivotal support braces are disposed contiguous to each other at a retention assembly attached to the mounting surface or, in the alternative, to a support frame.

In one presently preferred embodiment of the present invention, the retention assembly may include a single cross-brace member disposed through openings formed at the distal ends of the pivotal support braces and secured to the mounting surface. The mounting surface may be configured such that opposing ends of the cross-brace member are introduced through openings disposed in opposing sides of the mounting surface of the table top and may further include a mount for receiving and retaining the cross-brace member therein. Thus, the distal ends of both support pedestals are preferably attached along the length of the cross-brace member which is secured to the mounting surface, thereby reducing the number of attachment mechanisms and interrelating the support pedestals to the table top to increase structural support and efficiency of manufacture.

In another presently preferred embodiment, each support pedestal includes a first member pivotally engaging the mounting surface of the table top and a second member configured for telescoping engagement with the first member. This configuration permits the height of the support pedestal to be disposed between a lengthened position and a retracted position.

In an alternative presently preferred embodiment, the table may include two cross-brace members providing separate attachment points for the first and second pivotal support braces. Such a configuration is particularly desirable for tables having an extended length, in which it may not be advantageous for each of the pivotal support braces to have lengths sufficient for extending into the center of the table top. Correspondingly, a dual cross-brace configuration may provide additional space for accommodating one or more user's legs under the table top.

Moreover, in yet another presently preferred embodiment of the present invention, each support pedestal may include two legs slightly offset from the corresponding legs of the other support pedestal disposed on the opposing side of the table top, so that longer support legs can be accommodated under a smaller table top when disposed above an underlying surface. This off-set distance is sufficient to keep the support legs of the opposing support pedestal from interfering with one another, thus allowing displacement substantially against the mounting surface of the table top when disposed in the retracted position for storage.

From the foregoing, it will be appreciated that the present invention provides a portable folding utility table that is durable enough to withstand increased wear and tear yet is light-weight for easy set up and take down. The present invention also provides a novel center support assembly that provides increased structural stability to the table top with efficient design such that to allow the interrelation of the support pedestals. The center support assembly is also cost effective to manufacture and does not compromise the structural integrity of the table top. Further, the present invention provides a utility table that facilitates a height that is comfortable for one or more users to work at. The foregoing and other advantages and features of the present invention will become more fully apparent by examination of the following description of the presently preferred embodiments and appended claims, taken in conjunction with the accompanying drawings.

These and other objects and features of the present invention will become more fully apparent from the following description and appended claims, or may be learned by the practice of the invention as set forth hereinafter.

BRIEF DESCRIPTION OF THE DRAWINGS

To better understand the invention, a more particular description of the invention will be rendered by reference to the appended drawings. These drawings only provide information concerning typical embodiments of the invention and are not to be considered limiting of its scope. The invention will be described and explained with additional specificity and detail through the use of the accompanying drawings, in which.

DETAILED DESCRIPTION OF THE PREFERRED EMBODIMENTS

It will be readily understood that the components of the present invention, as generally described and illustrated in the Figures herein, could be arranged and designed in a wide variety of different configurations Thus, the following more detailed description of the embodiments of the assembly and method of the present invention, as represented in FIGS. 1 through 5, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

Figure 1:
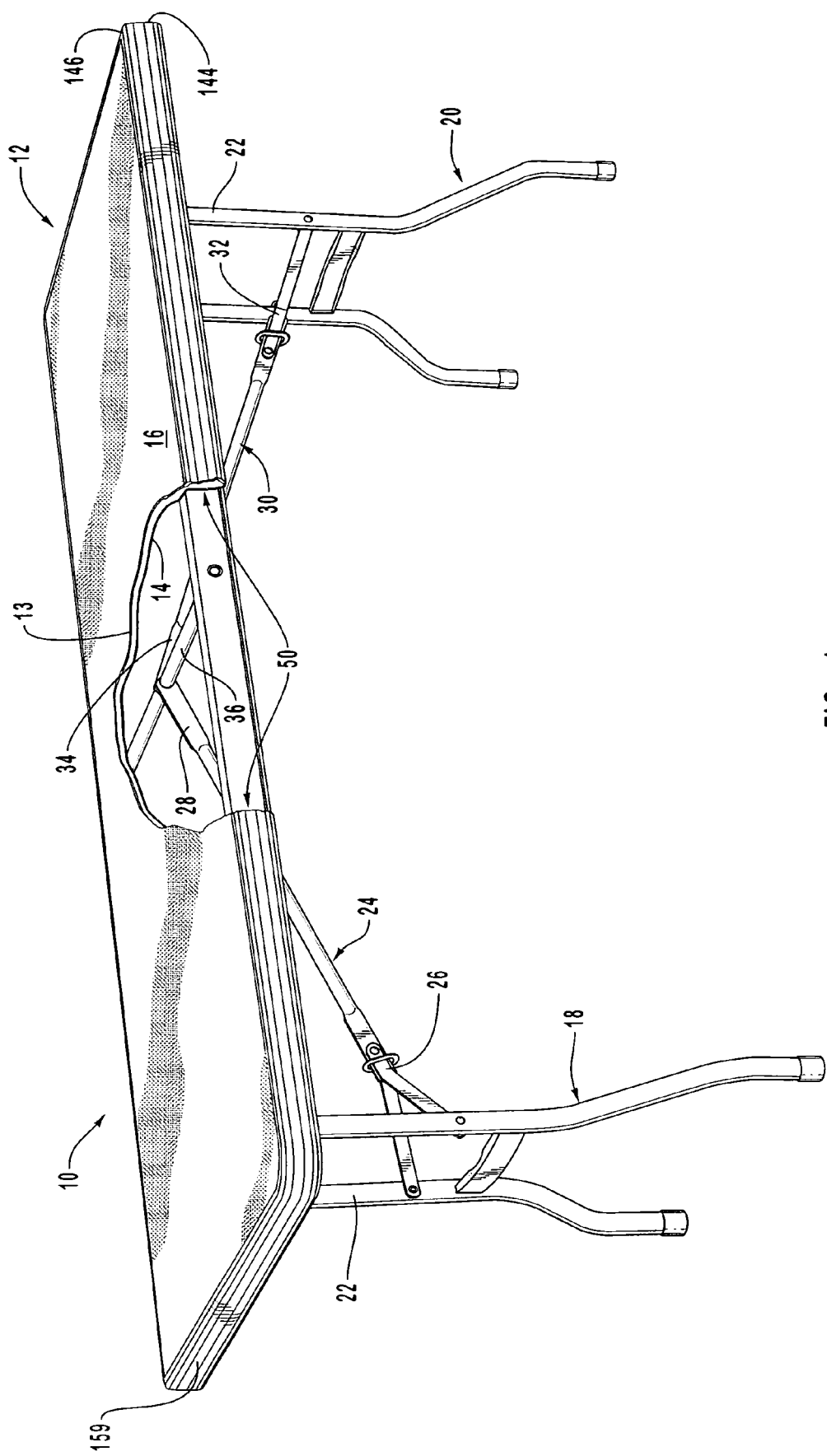
FIG. 1 is a perspective cut-away view of one presently preferred embodiment of a portable folding utility table with center support assembly.
Figure 2:
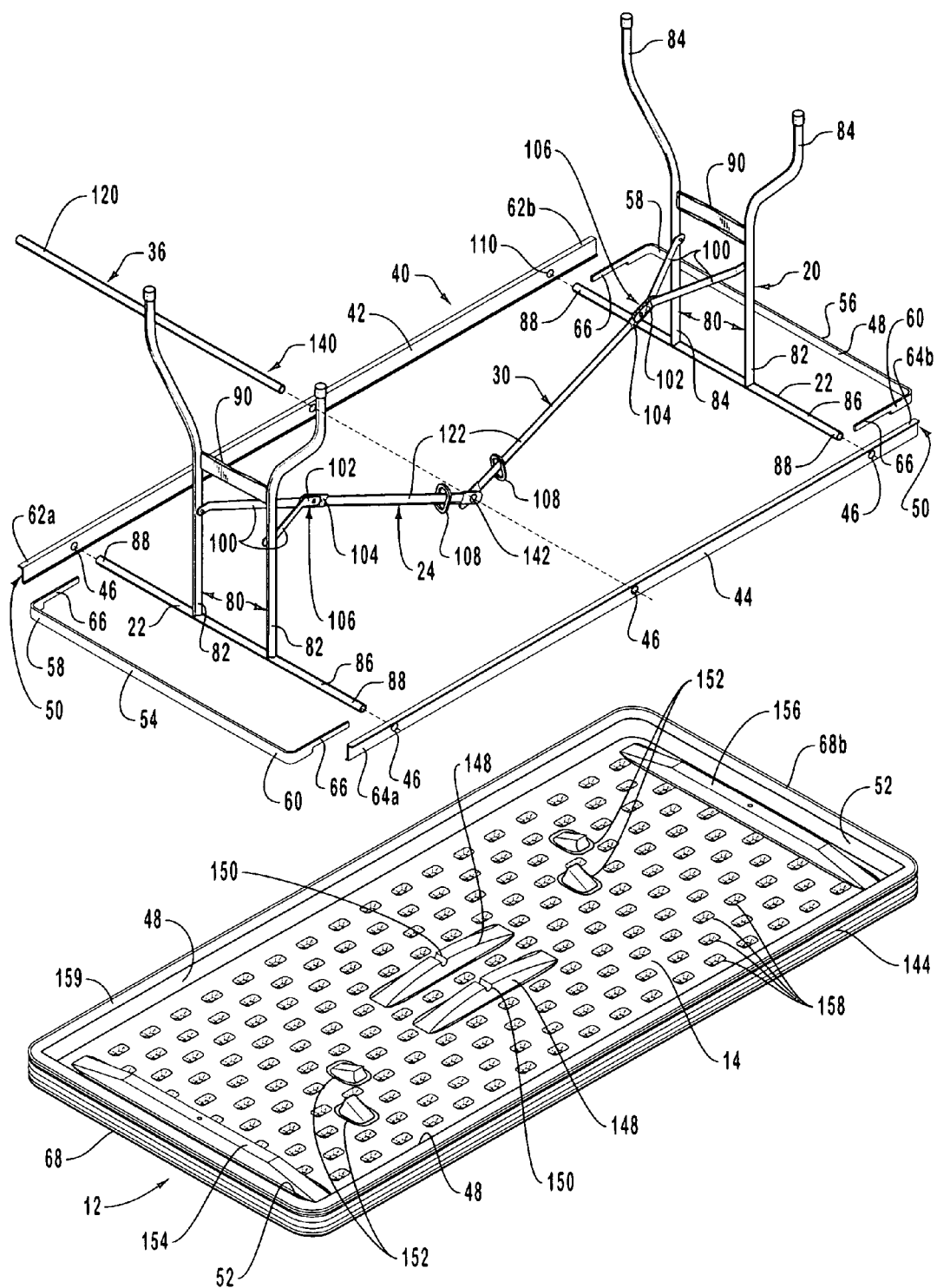
FIG. 2 is an exploded, perspective view of the embodiment of FIG. 1 illustrating various components of the present invention.

One presently preferred embodiment of the present invention, designated generally at 10, is best illustrated in FIGS. 1 and 2. As shown, with particular reference to FIG. 1, a utility table according to the present invention is generally designated at 10. The utility table 10 preferably includes a table top 12, having a mounting surface 14 and a working surface 16 disposed opposite the mounting surface 14. In one presently preferred embodiment, the table top 12 is supported by a first support pedestal 18 and a second support pedestal 20. The first and second support pedestals 18, 20 may each comprise a first end 22 attached to the mounting surface 14 of the table top 12.

Referring now to FIGS. 1 and 2, the utility table 10 of one presently preferred embodiment includes a first pivotal support brace 24 having a proximal end 26 attached to the first support pedestal 18 and a distal end 28 attached to the mounting surface 14. Similarly, a second pivotal support brace 30 is shown having a proximal end 32 attached to the second support pedestal 20 and a distal end 34 attached to the mounting surface 14. The distal end 28 of the first pivotal support brace 24 may be disposed contiguous the distal end 34 of the second pivotal support brace 30. The distal ends 28, 34 of the pivotal support braces 24, 30 are disposed in relation to a retaining assembly 36, which may be attached to the mounting surface 14. In one preferred embodiment, the retaining assembly 36 comprises a cross member.

As shown in FIG. 2, the utility table 10 includes a frame 40. The frame 40 may comprise a first side rail 42 and an opposing second side rail 44. Preferably, the first side rail 42 is disposed substantially parallel the opposing second side rail 44, thereby providing a generally longitudinal alignment therebetween. The first and second side rails 42, 44 may be configured with a plurality of retaining apertures 46 to facilitate attachment of the support pedestals 18, 20 and the cross brace member 36 to the frame 40.

In one presently preferred embodiment, the mounting surface 14 of the table top 12 comprises opposing longitudinal interior side walls 48 and opposing orthogonal interior side walls 52 disposed along an interior periphery of the table top 12. The first and second side rails 42, 44 may be secured to respective opposing longitudinal side walls 48, thus adding rigidity and strength to the structural integrity of table top 12. In one presently preferred embodiment, the side rails 42, 44 are secured to the opposing longitudinal side walls 48 by fasteners. It will be appreciated by those skilled in the art that the side rails 42, 44 may be secured to the opposing longitudinal side walls 48 of the mounting surface 14 using any number or variety of fasteners readily known in the art, such as, for example, screws, bolts, rivets, adhesives, or the like.

The cross-section of the side rails 42, 44 may be configured having an S-shape. In one presently preferred embodiment, the side rails 42, 44 may be attached to the respective longitudinal side walls 48, 50 as to form respective channels 50 along the side rails 42, 44 between the side rails 42, 44 and the longitudinal side walls 48 (See FIGS. 1 and 2). In this configuration, the first end 22 of the support pedestals 18, 20 may be positioned within opposing respective retaining apertures 46 formed in the side rails 42, 44 abutting the longitudinal side walls 48 within the channels 50, thereby substantially preventing lateral movement of the support pedestals 18, 20 relative to the table top 12. Likewise, the cross brace member 36 may be positioned within opposing respective retaining apertures 46 formed in the side rails 42, 44 abutting the longitudinal side walls 48 within the channels 50, thereby substantially preventing lateral movement of the cross brace member 36 relative to the table top 12. In one presently preferred embodiment, the support pedestals 18, 20 and the cross brace member 36 are preferably disposed substantially parallel to each other and in spaced-apart relationship, wherein the cross brace member 36 is positioned between the opposing support pedestals 18, 20. Still referring to FIG. 2, the frame 40 may also comprise a first end rail 54 and an opposing second end rail 56. Preferably, the first end rail 54 is disposed substantially parallel to the opposing end rail 56. Each end rail 54, 56 has a first end 58 and a second end 60 and is preferably positioned along the opposing orthogonal interior side walls 52 of the mounting surface 14 of the table top 12.

In one presently preferred embodiment, the first end 58 of each end rail 54, 56 is disposed within the channel 50 adjacent respective ends 62a, 62b of the first side rail 42. Likewise, the second end 60 of each end rail 54, 56 is disposed within a channel 50 adjacent respective ends 64a, 64b of the second side rail 44, thereby providing a generally rectangular shape to substantially correspond with the generally preferable rectangular shape of the table top 12.

In one presently preferred embodiment of the present invention, the first and second ends 58, 60 of respective end rails 54, 56 are configured with a tab member 66. The tab member 66 may be configured to fit within respective channels 50 beneath the retaining aperture 46 near the ends 62, 64 of the respective side rails 42, 44 with the utility table 10 in an upright position. It will be readily appreciated by those skilled in the art that, in this configuration, the tab members 66 act as levers with the support pedestals 18, 20 (positioned within the channels 50 near the ends 62, 64 of the respective side rails 42, 44), thus acting as corresponding fulcrums. In this manner, the end rails 54, 56 strengthen respective ends 68a, 68b of the table top 12, and protect against bowing of the table top 12 at the ends 68a, 68b. The first and second side rails 42, 44 in combination with the first and second end rails 54, 56 provide a means for structurally supporting the table top 12, the support pedestals 18, 20, and the pivotal support braces 24, 30. In this configuration, lighter weight table tops 12 may be used with this novel construction without losing rigidity or structural integrity.

As will be appreciated, the end rails 54, 56 may interrelate to the side rails 42, 44 in a variety of ways to provide structural support for the utility table 10 and help protect against bowing under various loads that may be applied to the utility table 10 For example, the end rails 54, 56 may be welded to the side rails 42, 44. The end rails 54, 56 may also be bonded to the side rails 42, 44 using a variety of suitable epoxies or resins. Further, the end rails 54, 56 and the side rails 42, 44 may be formed as a single unitary piece configured to the desired size and shape. Moreover, it will be also appreciated that the end rails 54, 56 and the side rails 42, 44 need not interrelate at all, but could simply be attached to the respective interior opposing side walls 48, 52 of the mounting surface 14 of the table top 12.

In one presently preferred embodiment of the present invention, the frame 40 is formed of a substantially sturdy, rigid material sufficient to provide structural integrity to the table top 12. For example, the frame 40 may be formed of metal. However, it will be readily appreciated that the frame may be formed of a wide variety of other suitable materials which are consistent with the spirit and scope of the present invention. It will further be appreciated that the size and configuration of the frame 40 will depend, in part, on the size and configuration of the table top 12. Accordingly, the table top 12 and the frame 40 may be configured in a variety of shapes and configurations, including, but not limited to, a circle, polygon, square, rectangle, triangle, or any other suitable geometrical configuration.

Figure 3:
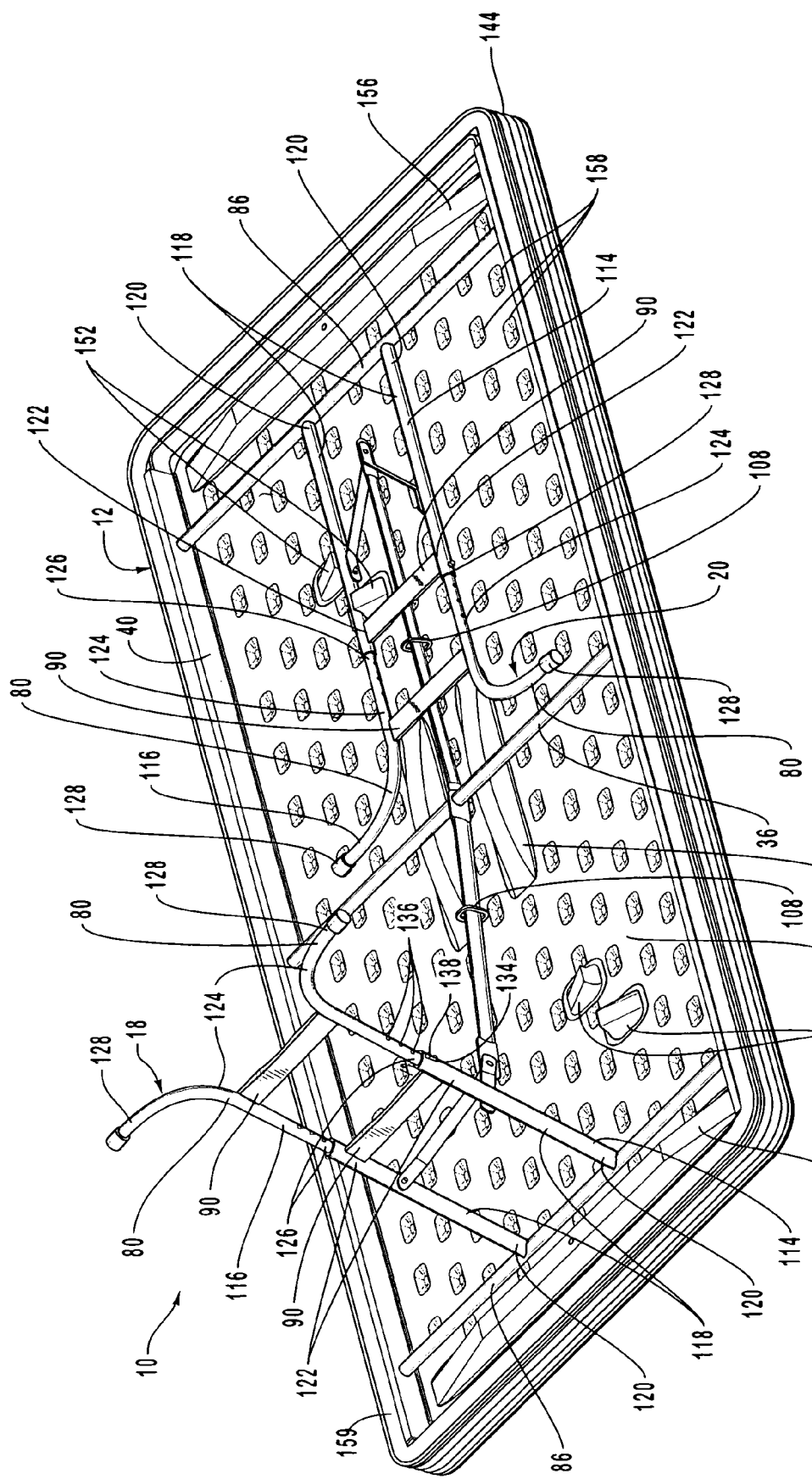
FIG. 3 is a perspective view of the embodiment of FIG. 1 illustrates a retaining assembly and support pedestals in relation to a mounting surface of the table top.

Referring now to FIG. 3, the shape and size of the frame 40 is configured to generally conform to the periphery of the mounting surface 14 of the table top 12. Specifically, in one presently preferred embodiment of the present invention, the frame 40 is attached in relation to the mounting surface 14 by means of fasteners (not shown) which generally penetrate both the frame 40 and an adjacent point of contact of the mounting surface 14. As will be appreciated by those skilled in the art, a variety of other suitable means or methods for attaching the frame 40 to the mounting surface 14 of the table top 12 may be employed, including, but not limited to, rivets, screws, bolts, glues, epoxies, or other bonding materials.

As can be best seen in FIGS. 2 and 3, the mounting surface 14 of the table top 12 is preferably configured to facilitate the attachment of the frame 40 to the mounting surface of the table top 12, in one presently preferred embodiment, the mounting surface 14 is configured with seats (not shown) positioned such that the end rails 54, 56 may be positioned between respective opposing orthogonal interior walls 52 and the seats (not shown). In this configuration, the end rails 54, 56 are substantially prevented from bowing inwardly toward the center of the utility table 10 under loads exerted upon the opposing ends of the table top.

It will be readily appreciated that the mounting surface 14 need not have interior side walls 48, 52 at all to practice the teachings of the present invention. In this regard, the teachings of the present invention may be practiced without a frame 40 if the table top 12 is sufficiently rigid. It will further be appreciated by those skilled in the art that in the embodiments where there is 110 frame, the support pedestals 18, 20 and cross brace member 36 may be attached to an interior portion of the mounting surface 14. Further, in preferred embodiments where there are interior side walls 48, 52 but no frame 40, the support pedestals 18, 20 and cross brace member 36 may be positioned directly in retaining apertures (not shown) formed within the interior side walls 48, 52 of the mounting structure 14 of the table top 12.

Referring back to FIG. 2, the support pedestals 18, 20 are pivotally attached to the mounting surface 14, thereby permitting each of the support pedestals 18, 20 to be moved between a collapsed position, in which each support pedestal 18, 20 lies flat in substantially the same plane as the table top 12, and an extended position, in which each support pedestal 18, 20 is folded outward, substantially perpendicular to the plane of the table top 12.

Each support pedestal 18, 20 may include a pair of substantially parallel posts 80. Those of ordinary skill in the art will appreciate that the teachings of the present invention can be practiced if each support pedestal 18, 20 has more or less than two posts 80. Each pair of posts 80 comprises a first end 82 and a second opposing end 84. In one presently preferred embodiment, the first end 82 of each respective pair of posts 80 is secured to a cross pole 86. Respective ends 88 of each cross pole 86 are preferably positioned within opposing retaining apertures 46 disposed within the opposing side rails 42, 44 of the frame 40 such that the support pedestals 18, 20 may be disposed substantially parallel to each other. In this configuration, each cross pole 86 rotates within respective pairs of retaining apertures 46 when respective pedestals 18, 20 move between the collapsed position and the extended position. In one presently preferred embodiment, a stabilizer arm 90 is preferably disposed between the respective pairs of posts 80 to assist in structurally maintaining the spaced-apart relationship of the posts 80.

It will be appreciated by those skilled in the art that the support pedestals 18, 20 may be configured in a variety of ways such that to practice the teachings of the present invention. For example, the support pedestals 18, 20 may comprise a solid or integral piece or the posts 80 may be curved in a different manner (e.g., see FIG. 3). It will further be appreciated by those of skill in the art that the support pedestals 18, 20 need not be in pivotal engagement with the table top 12 to be collapsible. For example, the support pedestals 18, 20 may simply be detachably engaged in relation to the table top 12 such that when it is desired to collapse the utility table 10 for storage, the support pedestals 18, 20 are removed from selective engagement with the table top 12.

As stated above, the first and second support pedestals 18, 20 are preferably connected to the table top 12 by means of the first and second pivotal support braces 24, 30, respectively. In one presently preferred embodiment of the present invention, the proximal ends 26, 32 of the respective pivotal support braces 24, 30 are bifurcated to facilitate pivotal engagement with the posts 80 of the respective support pedestals 18, 20 as illustrated in FIGS. 1, 2, and 3. The bifurcated proximal ends of the pivotal support braces 24, 30 each preferably comprise a pair of angled members 100.

Referring specifically to FIG. 2, the angled members 100 may include a tab member 102 which pivotally engages and partially overlaps a corresponding tab member 104 adjacent each of the distal ends 28, 34 of the pivotal support braces 24, 30, respectively, at an overlapping portion 106. When the support pedestals 18, 20 are in the extended position, the tabs 102 of the angled members 100 of the bifurcated proximal ends 26, 32 are disposed substantially parallel to the tabs 104 adjacent each distal end 28, 34 of the pivotal support braces 24, 30. When the support pedestals 18, 20 are in the collapsed position, the tabs 102 of the angled members 100 of the bifurcated proximal ends 26, 32 are disposed substantially unparallel to the tabs 104 adjacent each distal end 28, 34 of the pivotal support braces 24, 30. The utility table 10 may include a pair of locking collars 108 which slidably engage respective pivotal support braces 24, 30. The locking collars 108 are preferably sized to fit over respective overlapping portions 106 of the pivotal support braces 24, 30 when the support pedestals 18, 20 are in the extended position. With the locking collars 108 positioned over respective overlapping portions 106, the bifurcated proximal ends 26, 32 are prevented from moving relative to corresponding distal ends 28, 34 of the pivotal support braces 24, 30, thus preventing the support pedestal supports 18, 20 from being positioned in the collapsed position without first disengaging the locking collars 108, respectively. It will be appreciated by those skilled in the art that with the utility table 10 in an upright position and the support pedestals 18, 20 in the extended position, the collars 108 may, under the force of gravity, position themselves about the overlapping portions 106. It will be further appreciated that a variety of other locking mechanisms as assemblies may be utilized to lock the support pedestals 18, 20 in the extended position which are consistent with the spirit and scope of the present invention, including latches or other fasteners.

With reference now to FIG. 3, the utility table 10 is shown having an alternative configuration of the support pedestals 18, 20. In this alternate embodiment, each support pedestal 18, 20 comprises a first member 114 pivotally engaged to the mounting surface 14 of the table top 12 and a second member 116 configured for telescoping engagement with the first member 114, thereby permitting the height of each support pedestal 18, 20 to be selectively disposed at a plurality of predetermined heights between a lengthened position and a retracted position.

In one presently preferred embodiment, each first member 114 of the support pedestals 18, 20 includes a pair of outer members 118 each having a proximal end 120 and a distal end 122. The proximal end of each outer member 118 is connected to the table top 12 by means of the cross pole 86 to which they are preferably fixed (e.g., welded). The second member 116 of each support pedestal 18, 20 includes a pair of inner members 124 each having a proximal end 126 and a distal end 128. The proximal end 126 of the inner members 124 are configured in dimensional size and shape to engage the distal ends 122 of the outer members 118 in telescopic engagement. It will be appreciated by those of ordinary skill in the art that one or more stabilizer arms 90 may be employed to support the telescopic pedestals 18, 20.

Preferably, the inner members 124 and outer members 118 are separated by a hard plastic bushing (not shown) to facilitate the slidable movement of the inner members 124 relative to the outer members 118. Each bushing may be held in place with two small extensions that extend through small holes (not shown) in the outer members 118. It will be appreciated by those of skill in the art that there are a number of ways to facilitate the telescopic movement of the first member 114 relative to the second member 116 of each support pedestal 18, 20.

In the preferred embodiment illustrated in FIG. 3, the support pedestals 18, 20 include means for locking the support pedestals 18, 20 in preselected positions between the retracted position and the lengthened position. At least one of the inner members 124 is configured with a first hole 134. A corresponding outer member 118 may be configured with at least one hole 136 and preferably a plurality of holes 136 positioned such that at a preselected table top 12 height the first hole 134 in the inner member 124 may be aligned with a second hole 136 in the outer member 118. In one presently preferred embodiment, a snap pin mechanism 138 may be positioned adjacent the first hole 134 within the inner member 124 such that the pin 138 is biased outwardly through the aligned holes 134, 136, thereby locking the inner and outer members 118, 124 of the support pedestals 18, 20 in a preselected position. By supplying sufficient force to the pin mechanism 138, it may be disengaged and removed from the hole 136 in the outer member 118, thereby permitting relative movement between the inner 124 and outer 118 members of the support pedestals 18, 20 and allowing the support pedestals 18, 20 to be selectively raised or lowered. It will be appreciated by those skilled in the art that a variety of other adjustment mechanisms as assemblies known in the art for locking the first and second support pedestals 18, 20 in an extended position may be utilized and are herein incorporated.

As best shown in FIGS. 1, 2, and 3, the distal ends 28, 34 of each pivotal support brace 24, 30 are engageably secured to the retaining assembly 36 (e.g., cross brace member). In one presently preferred embodiment of the present invention, the distal ends 28, 34 of each pivotal support brace 24, 30, respectively, are pivotally attached to the retaining assembly 36. Each of said distal ends 28, 34 are configured with an opening 142 having an interior periphery sufficient for engaging at least a portion of the linear length of the cross-brace member 36.

It will be appreciated by those skilled in the art that the retaining assembly 36 generally provides structural support to the center of the table top 12 of the utility table 10. It will further be appreciated that with the distal ends 28, 34 attached contiguous each other in retention to the cross brace member 36 forces applied to the table top 12 which would ordinarily be transferred through one of the support pivotal braces 24, 30, respectively, into the table top 12 causing it to bow, will substantially be nullified by the counter force provided by the opposing pivotal support brace 24, 30, respectively.

For example, the horizontal component of a force applied by a user at one end 68a of the table top 12 will act upon the pivotal support brace 18 and, because the distal ends 28, 34 of the pivotal support braces 24, 30, respectively, are attached to the retaining assembly 36, an equal and opposite horizontal force component applied by the other pivotal support brace 20 will substantially cancel out the horizontal component of the original force. Accordingly, the present invention provides increased structural support to the table top 12 with fewer parts. As will be appreciated by those skilled in the art, the retaining assembly 36 can be disposed in a variety of configurations which are consistent with the spirit and scope of the present invention so as to allow the pivotal support braces 24, 30 to supportably interrelate with each other. Such alternative configurations are discussed below.

With reference to FIGS. 1, 2, and 3, the table top 12 is preferably formed of a blow-molded plastic, and specifically, high density polyethylene. It will be appreciated by those of skill in the art, however, that the table top 12 may be formed of a variety of other sufficiently sturdy materials such as, plywood, particle board, solid wood, wood slates, metal alloys, fiberglass, ceramics, graphite, any of numerous organic, synthetic or processed materials, including thermoplastic or thermosetting polymers of high molecular weight with or without additives, such as, plasticisers, auto oxidants, extenders, colorants, ultraviolet light stabilizers, or fillers and/or other composite materials.

Referring back to FIG. 1, in one presently preferred embodiment of the present invention, the working surface 16 of the table top 12 may be smooth or, in the alternative, textured, if desired. In addition, the working surface 16 may comprise an outer periphery 144 having at least a portion 146 which is beveled to increase the comfort of a person resting their arms against the edges of the table top 12. In one presently preferred embodiment, the entire outer periphery 144 of the working surface 16 of the table top 12 is beveled. The height of the blow-molded table top 12 of one presently preferred embodiment is about five centimeters, the thickness of any pan 13 of the blow-molded table top 12 is preferably about one-half of a centimeter to about three-quarters of a centimeter.

Referring now to FIGS. 2 and 3, the mounting surface 14 may include at least one mounting member 148. Preferably, a pair of mounting members 148 is attached to the mounting surface 14 to receive and retain the cross brace member 36 of the retaining assembly. In one presently preferred embodiment, each mounting member 148 includes a recess or groove 150 configured with a corresponding size and shape sufficient to retain the cross brace member 36 therein. For example, the cross brace member 36 may snap fit into the recess or groove 150 of the mounting member 148.

Additionally, the mounting surface 14 of the table top 12 may further include one or more securing members 152 for securing each of the support pedestals 18, 20, respectively. Preferably, a pair of securing members 152 is disposed in relation to the mounting surface 14 for releasably securing a respective support pedestal 18, 20 in the collapsed position adjacent the mounting surface 14. Each securing member 152 is generally configured and disposed relative to the mounting surface 14 such that when the support pedestals 18, 20 are in the collapsed position, at least one securing member 152 frictionally engages a support pedestal post 80 such that the support pedestals 18, 20, respectively, may be maintained in the collapsed position, as illustrated in FIG. 3. In one presently preferred embodiment of the present invention, a pair of securing members 152 are offset on opposing sides of a single support pedestal post 80 for securing each of the support pedestals 18, 20, respectively, in the collapsed position. It will be apparent that other mechanisms may be constructed in accordance with the inventive principles set forth herein for securing the support pedestals 18, 20 in the collapsed position. It is intended, therefore, that the examples provided herein be viewed as exemplary of the principles of the present invention, and not as restrictive to a particular structure for implementing those principles.

Referring now to FIGS. 2 and 3, a first manifold 154 and a second manifold 156 are preferably disposed at opposing ends 68a, 68b of the table top 12. The manifolds 154, 156 provide additional support for the ends 68a, 68b of the table top 12 and assist in facilitating the blow molding process by providing a means for uniformly dispersing air down the length of the table top 12. The mounting surface 14 of the table top 12 may also include a plurality of depressions 158 (e.g., kiss-offs) which tend to add structural support and integrity to the table top 12. In one presently preferred embodiment, these depressions 158 are uniformly distributed throughout the mounting surface 14 of the table top 12.

The structural features of the table top 12, including the beveled edges and/or textured working surface 16, the mounting members 148, the securing members 152, the manifolds 154, 156, and the depressions 158 may be integral with the table top 12 and may be formed by means of a corresponding mold and blow-molding process. It will be appreciated by those skilled in the art that there are alternative ways to create and attach these features. For example, the mounting members 48, securing members 152, and manifolds 154, 156 may be separate pieces that are attached to the mounting surface 14 by adhesive bonding or the use of conventional fasteners. Likewise, the texturing and/or beveling of the edges of the working surface of the table top and the introduction of depressions into the mounting surface may also be accomplished after the table top 12 is molded by a variety of conventional methods readily known in the art.

As discussed above, the table top 12 includes an outer periphery 144 and a portion 146 of the outer periphery may be beveled, for example, to increase the comfort of a person resting their arms against the table 10. As shown in the accompanying figures, the table top 12 may also include an outer lip 159 that is generally disposed about the outer periphery 144 of the table top 12. Preferably, the lip 159 forms at least part of an outer edge or boundary of the table top 12. One skilled in the art will appreciate that the lip 159 does not have to create the outer edge of the table top 12 and the lip can extend around all or only a portion of the table top 12.

The table top 12 and lip 159 are preferably integrally formed during a blow-molded process to create a unitary, one-piece structure. Advantageously, the integral, one-piece table top 12 and lip 159 may assist in creating a solid and sturdy table 10. For example, because the table top 12 and lip 159 are preferably formed as part of an integral structure, there are no connections or attachments that can break or fail. Additionally, the integral formation of the table top 12 and lip 159 may increase the strength and structural rigidity of the table top. Further, the integral formation of the table top 12 and lip 159 may create a more cost-effective table 10 because the lip does not have to be subsequently attached or connected. Finally, the one-piece table top 12 and lip 159 may form a very comfortable, lightweight, and useful table top because no connections are required and no sharp edges are exposed. It will be appreciated, however, that the table top 12 and lip 159 may be formed by separate pieces that are subsequently attached by any suitable mechanism or method such as fasteners, adhesives, and the like. It will also be appreciated that the table top 12 and lip 159 can be constructed or manufactured by any suitable process or mechanism.

The lip 159 is preferably disposed about the outer periphery 144 of the table top 12 and at least a portion of the lip extends in an opposite direction from the upper or working surface 16 of the table top. For example, as best seen in FIGS. 2 and 3, the lip 159 may extend downwardly or outwardly from the underside of the table top 12. In particular, the lip 159 may include an upper portion that is disposed proximate the working surface 16 and an opposing lower portion. The upper portion of the lip 159 is preferably aligned with the working surface 16 of the table top 12 to create a generally planar surface, but the upper portion may also be located above or below the working surface of the table top. The lower portion of the lip 159 extends beyond or past the mounting surface 14 of the table top 12. The lip 159 preferably has a height of about five centimeters measured from the upper portion to the lower portion, but the lip can have any suitable height depending, for example, upon the size and configuration of the table 10.

The upper portion of the lip 159, on the other hand, may be disposed proximate the mounting surface 14 of the table top 12 and the lower portion of the lip extend beyond or past the mounting surface of the table top. Thus, in this configuration, the lip 159 protrudes downwardly from the mounting surface 14 of the table top 12 and the height of the lip is the distance from the mounting surface to the lower portion of the lip. The lip 159 preferably has a height of about five centimeters measured from the mounting surface 14 to the lower portion. One skilled in the art, however, will appreciate that the lip 159 can have any suitable size and/or configuration depending, for example, upon the intended use of the table 10.

As best seen in FIGS. 1, 2 and 3, the lip 159 includes an outer surface and an inner surface. The outer surface of the lip 159 preferably forms at least a portion of the periphery 144 of the table top 12 and all or a portion of this outer periphery may be beveled 146. As shown in the accompanying figures, the outer surface of the lip 159 may also be contoured to include one or more steps or ledges. Preferably, these steps or ledges create a graduated or divided outer surface that may extend outwardly and/or inwardly relative to the table top 12. For example, as shown in FIG. 1, the lip 159 may include an upper beveled surface, a series of three or more steps or ledges, and a lower beveled surface. The upper steps preferably extend outwardly from the table top 12 and the lower steps preferably extend inwardly to form a somewhat rounded or curved outer surface of the lip 159. It will be appreciated that the lip 159 can have any suitable configuration such as a plurality of steps, ledges or ridges; a curved, straight, slanted or sloped outer surface; or a combination of straight, slanted or curved surfaces. Additionally, all or only a portion of the lip 159 may have a contoured surface and the contoured surface may also be configured to help increase the strength or structural integrity of the table top.

The inner surfaces of the lip 159 form the interior side walls 48, 52 and, as discussed above, the interior side walls may be used to securely attach the frame 40 to the table top 12. As shown in the accompanying figures, the interior side walls 48, 52 extend from the mounting surface 14 of the table top 12 to the lower portion of the lip. Thus, the interior side walls 48, 52 have a height extending from the mounting surface 14 to the lower portion of the lip 159. As best seen in FIGS. 2 and 3, the inner surfaces of the lip 159 have a height that is generally equal to or less than the height of the outer portions of the lip.

In greater detail, as seen in FIGS. 2 and 3, the inner surfaces of the lip 159 that extend longitudinally along the length of the table top 12 are preferably sized and configured to receive the first side rail 42 and second side rail 44 of the frame 40. The inner surfaces of the lip 159 that extend orthogonally along the ends of the table top 12 are preferably sized and configured to receive the first end rail 54 and second end rail 56 of the frame 40. Desirably, as shown in FIG. 1, the heights of the inner surfaces of the lip 159 are generally equal to or greater than the height of the frame 40 so that the frame is generally hidden from view when the table 10 is being used or ready for use. In particular, the inner surfaces of the lip 159 that extend longitudinally near the edges of the table top 12 desirably have a height that is generally equal to or greater than the height of the first and second side rails 42, 44 of the frame 40 so that this portion of the frame is generally hidden from view. Additionally, the inner surfaces of the lip 159 that extend orthogonally near the ends of the table top 12 desirably have a height that is generally equal to or greater than the height of the first and second end rails 54, 56 of the frame 40 so that this portion of the frame is generally hidden from view. Thus, the lip 159 can be configured to generally hide the frame 40 when the table 10 is viewed from a plane that is generally aligned with or above the table top 12.

Advantageously, because the frame 40 may be completely or generally hidden from view, the frame does not have to be finished and may contain visible imperfections or flaws. For example, the frame 40 may have one or more exposed welds, rough edges, sharp surfaces, unpainted surfaces, gaps, openings, and the like, but these portions of the frame may be hidden from view and/or covered by the lip 159 of the table top 12. Significantly, this may decrease the cost to manufacture the table 10 because at least a portion of the frame 40 may not have to be finished and/or may contain superficial or readily apparent blemishes or imperfections. Further, because the lip 159 may hide all or a part of the connection or attachment of the frame 40 to the table top 12, that may create a more aesthetically pleasing table 10. The lip 159 may also hide all or a portion of the pivotal connection of the first and second support pedestals 18, 20 to the mounting surface 14 of the table top 12. It will be appreciated, however, that the lip 159 does not have to cover or hide the frame 40 from view, and all or a portion of the frame 40 may be visible or exposed.

As best illustrated in FIG. 1, when the utility table 10 is disposed in an upright position in relation to an underlying surface and the support pedestals 18, 20 extended with the collars 108 placed over the overlapping portions 106 of the respective pivotal support braces 24, 30, the utility table 10 of the present invention is positioned for use. When a user desires to collapse the utility table 10 for storage, one presently preferred method for doing so is to invert the utility table 10, as shown in FIG. 3. With the utility table 10 in the inverted position, the collars 108 may be slid away from engagement with the overlapping portion 106 of the respective pivotal support braces 24, 30. This allows the support pedestals 18, 20 to be folded inwardly toward the table top 12 into the collapsed position. With the support pedestals 18, 20 in the collapsed position, the utility table 10 can easily be moved and stored.

Figure 4:
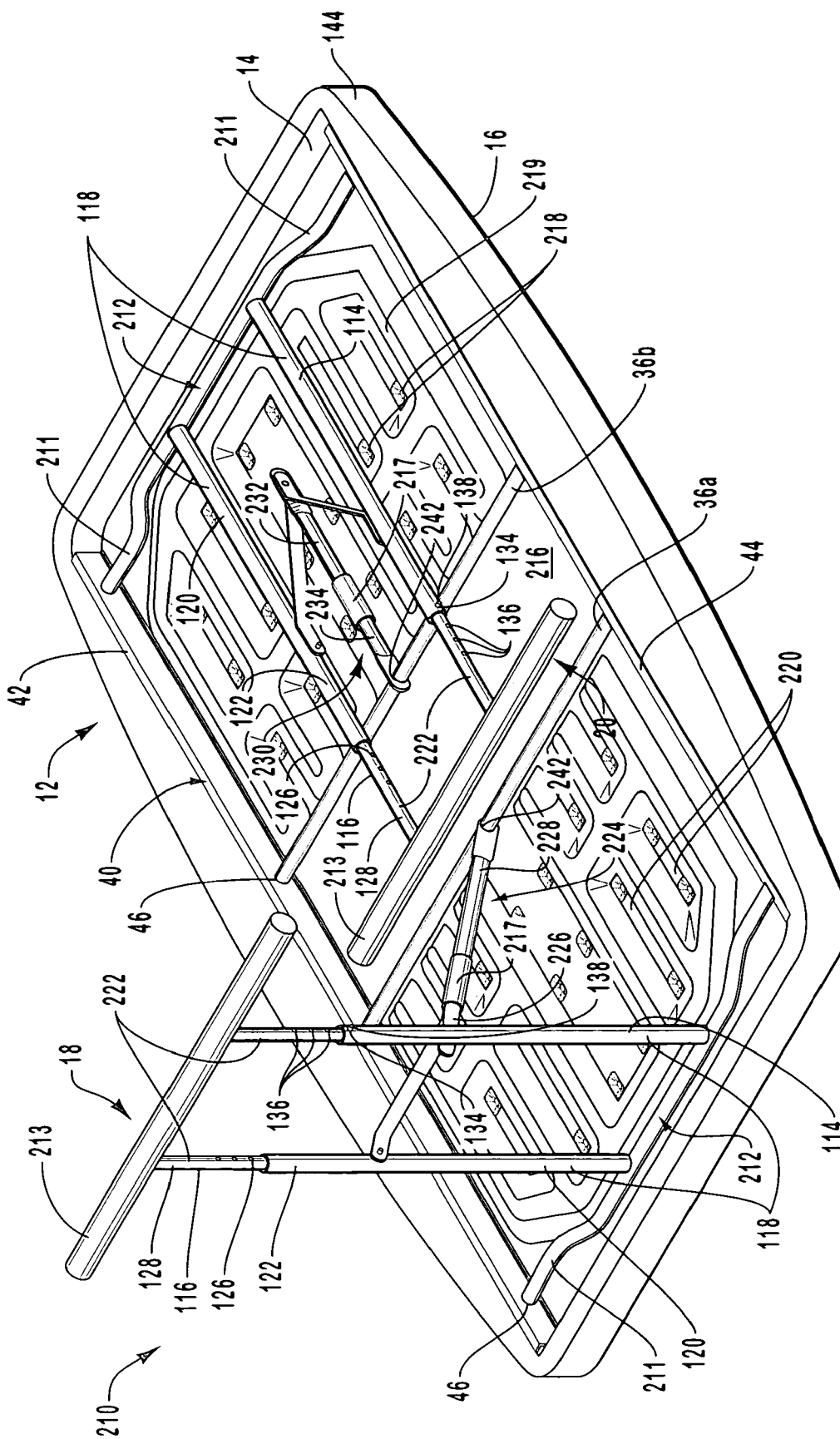
FIG. 4 is a perspective view of another presently preferred embodiment of the portable folding utility table that includes two center support assemblies.

With reference now to FIG. 4, another presently preferred embodiment of the utility table of the present invention is generally designated at 210. In this embodiment, the utility table 210 includes a table top 12 having a mounting surface 14 and a working surface 16 disposed opposite the mounting surface 14. A first support pedestal 18 and a second support pedestal 20 are pivotally attached to the mounting surface 14 of the table top 12. Preferably, the first and second support pedestals 18 20 are independently attached to a support bar 212 having opposing ends 211 configured to engage receiving apertures 46 formed in opposing side rails 42, 44 of a rigid flame 40 supportably disposed in relation to the table top 12.

In one presently preferred embodiment, the support bar 212 is configured having a bend formed at its opposing ends 211 to ensure that the first and second support pedestals 18, 20, respectively, fold properly against the mounting surface 14 of the table top 12 when disposed in the collapsed position As appreciated, the slight bend formed at the opposing ends 211 of the support bar 212 has the structural effect of extending the central portion of the support bar 212 away from the axis of rotation of the support bar 212 relative to the frame 40. Moreover, the bending configuration of the support bar 212 at its opposing ends 211 provides additional safety, in proportion to the weight applied against the table top 12, by maintaining the first and second support pedestals 18 and 20 in the extended position.

The support bar 212 may be omitted from engagement with the proximal end 120 of the support pedestals 18, 20 in favor of a suitable attachment assembly designed to facilitate pivotal engagement between the support pedestals 18, 20 and the mounting surface 14 of the table top 12. Those skilled in the art will readily recognize other possible modifications and adaptations which are consistent with the spirit and scope of the present invention and which are herein contemplated by the present invention.

Still referring to FIG. 4, the utility table 210 of the present invention may include each first member 114 of the support pedestals 18, 20 having a pair of outer members 118 each having a proximal end 120 and a distal end 122. The proximal end of each outer member 118 is connected to the table top 12 by means of the support bar 212 to which they are preferably fixed (e.g., welded). The second member 116 of each support pedestal 18, 20 includes a pair of inner members 124 each having a proximal end 126 and a distal end 128. The proximal end 126 of the inner members 124 are configured in dimensional size and shape to slidably engage the distal ends 122 of the outer members 118 in telescopic engagement.

Preferably, the inner members 124 and outer members 118 are separated by a hard plastic bushing (not shown) to facilitate the slidable movement of the inner members 1124 relative to the outer members 118. Each bushing may be held in place with two small extensions that extend through small holes (not shown) in the outer members 118. It will be appreciated by those of skill in the art that there are numerous ways to facilitate the telescopic movement of the first member 114 relative to the second member 116 of each support pedestal 18, 20 which are readily contemplated herein. It is also contemplated herein that the length of the support pedestals 18, 20 may be fixed and, thus not selectively adjustable to a plurality of heights.

As illustrated in FIG. 4, an elongated foot member 213 may be rigidly attached at the distal end 128 of each of the inner members 124 of the support pedestals 18, 20 so as to provide additional stability to the table top 12 when disposed in the upright position.

Preferably, the foot member 213 facilitates a more even dispersion of the supportable weight of the utility table 210 over a greater portion of the underlying surface in addition, because the length of the foot member 213 tends to span the distance between the first and second members 114, 116, one or more stabilizer arms 90 may be unnecessary.

Similar to the preferred embodiments of the utility table illustrated in FIGS. 1-3, the utility table 210 includes a first pivotal support brace 224 having a bifurcated proximal end 226 attached to the first support pedestal 18 and a distal end 228 pivotally attached to a first retaining assembly 36a. Similarly, a second pivotal support brace 230 having a bifurcated proximal end 232 attached to the second support pedestal 20 and a distal end 234 pivotally attached to a second retaining assembly 36b. In one presently preferred embodiment, each of the retaining assemblies 36a, 36b comprise a cross-brace member having opposing ends and an intermediate body portion formed therebetween. Each of the distal ends 228, 234 of the pivotal support braces 224, 230 are configured with openings 242 having an internal periphery sufficient for engaging at least a portion of the length of the intermediate body portion of the cross-brace members 36a, 36b, respectively.

The opposing ends of the first and second cross-brace members 36a, 36b, respectively, are configured so as to be introduced and retained within corresponding retaining apertures 46 formed in opposing side rails 42, 44 of the frame 40 or, in the alternative, within opposing, interior side walls of the table top 12. Preferably, the first and second cross-brace members 36a, 36b are separated by a central portion 216 of the table top 12. Structurally, this central potion 216 of the table top 12 must have sufficient structural integrity to support a compressive load, either through the frame 40, the entire surface of the table top 12, or by some combination of the two, when weight is applied against the table top 12 to avoid bowing.

The dual cross-brace supportable configuration of the utility table 210 of the present invention is advantageous because the pivotal support braces 24, 30 obstruct less of the available space beneath the table top 12 and between the support pedestals 18, 20 Consequently, more room is available to accommodate the legs of one or more users beneath the table top 12, thereby making the utility table 210 more comfortable to users. Furthermore, the absence of the cross-brace members 36a, 36b from the central portion 216 of the table top 12 provides usable storage space to accommodate the foot members 213 when the support pedestals 18, 20 are disposed in the collapsed position. As will be appreciated by those skilled in the art, the central portion 216 integrally formed in the mounting surface 14 of the table top 12 may be configured having a wider or narrower dimension than illustrated by way of example in FIG. 4, depending on the overall extended length of the table top 12, the supportable weight the table top is designed to bear, the size of the foot members 213, and/or the need for usable space beneath the table top 12 when the utility table 210 is disposed in the usable position.

In one presently preferred embodiment, a pair of locking collars 217 is provided which slidably engage respective overlapping portions of the pivotal support braces 224, 230. The locking collars 217 are preferably configured and sized such that when the support pedestals 18, 20 are selectively disposed in the extended position, the locking collars 217 may be engageably positioned in relation to the overlapping portions to prevent the bifurcated proximal ends 226, 232 from moving relative to the corresponding distal ends 228, 234 of the pivotal support braces 224, 230, thus preventing the support pedestal supports 18, 20 from being positioned in the collapsed position without first disengaging the locking collars 217, respectively.

As with the previous preferred embodiments illustrated in FIGS. 1-3, a plurality of kiss-offs 218 may be formed in the mounting surface 14 of the table top 12 to add structural integrity and strength to the working surface 16 of the blow-molded table top. In addition, a plurality of plateaus 219 and longitudinal trenches 220 may also be formed in the mounting surface 14 to further add stiffening and strength to the table top 12. Correspondingly, these plateaus 219 and trenches 220 operably function to increase the section modulus of the table top 12 by moving material away from the neutral axis of the table top 12, thus making it more difficult to bend the table top 12 in a longitudinal direction, as when a heavy load is positioned in the middle of the table top 12. As will be appreciated, the kiss-offs 218 may be formed within the trenches 220 to ensure that the table top 12 can be made hollow without concern that the working surface 16 may have a tendency to flex inwardly toward the mounting surface 14 when a weight is placed on the table top 12.

Additionally, an opening 222 may be formed in the table top 12 to provide means for introducing a support pole of an umbrella assembly (not shown) or the like. Although certain structural elements and components, such as: (1) one or more stabilizer arms 90 engageably disposed in relation to the first and second member 114, 116 of the support pedestals 18, 20 (see FIGS. 2 and 3); (2) one or more mounting members 148 for supportably retaining the retaining assembly 36 in relation to the mounting surface 14 of the table top 12 (see FIGS. 2 and 3); (3) one or more securing members 152 attached to the mounting surface 14 of the table top 12 for securing the support pedestals 18, 20 in the collapsed position (see FIGS. 2 and 3); (4) one or more manifolds 154, 156 that assist in facilitating the blow molding process by providing for uniform dispersion of air along the length of the blow-molded table top 12 (see FIGS. 2 and 3); and (5) beveled edges and/or a textured working surface 16 (see FIG. 1) have been omitted from the embodiment of the utility table 210 illustrated in FIG. 4. It is contemplated herein that one or more of these structural features, however, may be incorporated into the alternate design of the utility table 210, if desired.

Figure 5:
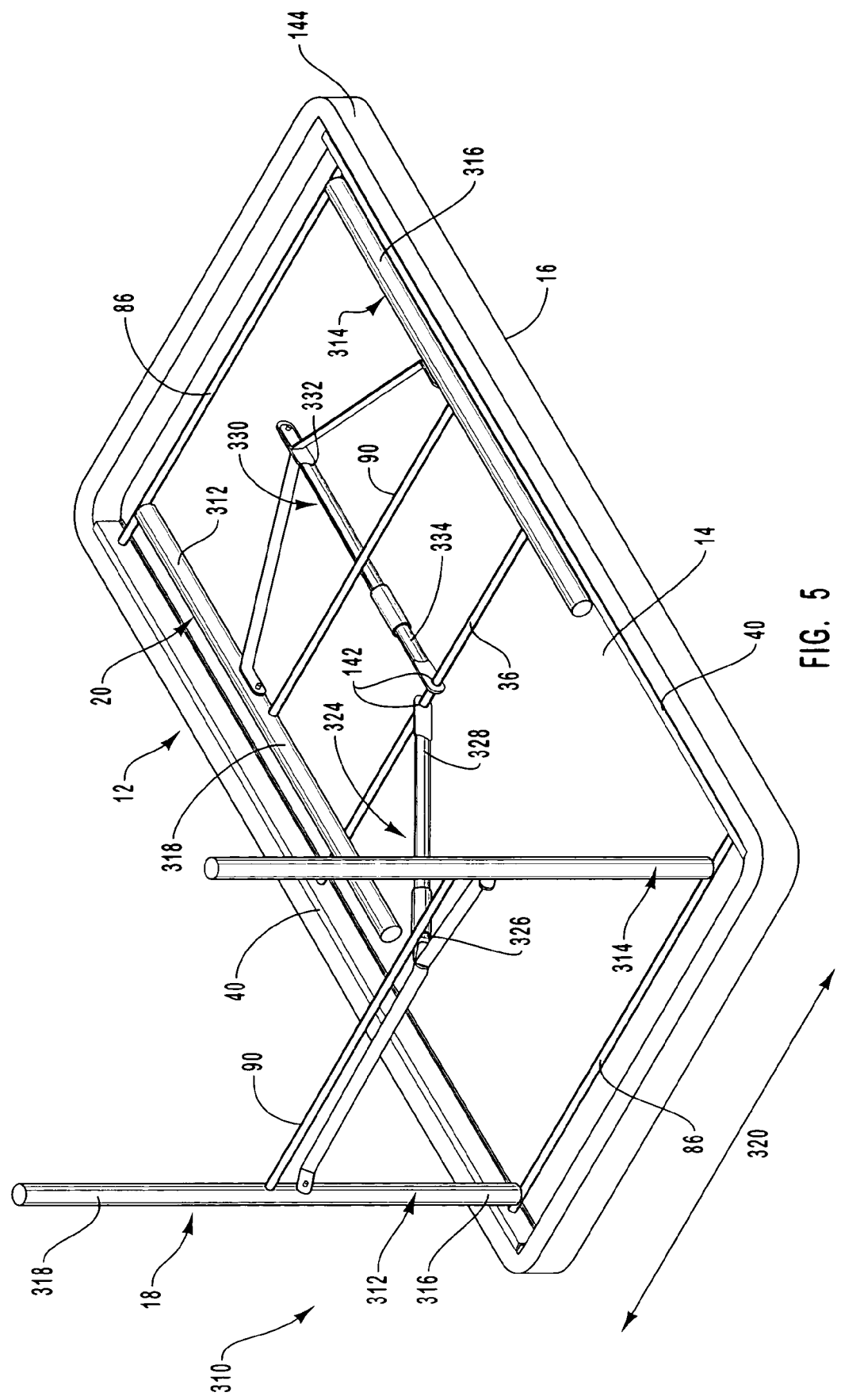
FIG. 5 is a perspective view of yet another presently preferred embodiment of the portable folding utility table with center support assembly with an off-set disposition of the legs of the opposing support pedestals.

With reference now to FIG. 5, another presently preferred embodiment of the utility table of the present invention is (generally designated at 310. As shown, the utility table 310 includes a table top 12 having a mounting surface 14 and a working surface 16 disposed opposite the mounting surface. Structurally, the table top 12 is preferably supported above an underlying surface by a first support pedestal 18 and a second support pedestal 20 disposed at spaced-apart relationship to the first support pedestal. Both the first and second support pedestals 18, 20 are preferably attached to the mounting surface 14 or, in the alternative, to a rigid support frame 40. A first pivotal support brace 324 includes a proximal end 326 pivotally attached to the first support pedestal 18 and a distal end 328 pivotally attached to a retaining assembly 36. Similarly, a second pivotal support brace 330 is shown having a proximal end 332 pivotally attached to the second support pedestal 20 and a distal end 334 pivotally attached to the retaining assembly 36 As will be appreciated, the distal ends 328, 334 of the first and second pivotal support brace 324, 330, respectively, may be pivotally attached to the mounting surface 14 by means of a engaging bracket (not shown).

Because the alternate preferred embodiment of the utility table 310, as illustrated in FIG. 5, is substantially similar in construction to the utility table 10 shown in FIGS. 1-3, only those structural variations which exist between these two embodiments will be further disclosed hereinbelow.

Specifically, one presently preferred embodiment of the utility table 310 includes a first support pedestal 18 having two support legs 312, 314. Each of the support legs 314. 312 of the first support pedestal 18 may be formed having a proximate end 316 rigidly attached to a cross pole 86 mounted in pivotal relation to the frame 40 or, in the alternative, to the mounting surface 14 of the table top 12 independent of the other leg. Similarly, each of the support legs 314, 312 of the second support pedestal 20 may be formed having a proximate end 316 rigidly attached to a cross pole 86 mounted in pivotal relation to the frame 40 or, in the alternative, to the mounting surface 14 of the table top 12 independent of the other leg.

To accommodate a table top 12 having a length that is smaller than the fixed or extendable length of the legs 312, 314 of the support pedestals 18, 20, the relative disposition of the distal ends 318 of each of the support legs 312, 314 of the first support pedestal 18 are offset from the corresponding distal ends 318 of each of the support legs 312, 314 of the second support pedestal 20 disposed on an opposite side of the table top 12. The distal end 318 of the first support leg 312 of the first support pedestal 18 is offset in a lateral direction 320 from the second support leg 314 of the first support pedestal. Similarly, the distal end 318 of the first support leg 312 of the second support pedestal 20 is offset in a lateral direction 320 from the second support leg 314 of the second support pedestal 20. This offset configuration enables the use of a smaller table top 12 and frame 40 because the support pedestals 18, 20 can include a length greater than the distance between the opposing ends of the table top 12, and yet still fold into a parallel configuration relative to the mounting surface 14 of the table top 12 without interference by the distal ends 318 of each of the support legs 312, 314 of the first and second support pedestals 18, 20.

The foregoing function can be structurally accomplished in a variety of ways. For example, both the proximal and distal ends 316, 318 of the support legs 312, 314 may be laterally offset so that the legs 312, 314 are always parallel to the frame 40, as shown in FIG. 5. Alternatively, the proximal ends 316 may remain aligned in the folded position, and the legs 312, 314 may fold at an angle. This may be done by pivotally mounting the proximal ends 316 to the mounting surface 14 at an angle, or by mounting the cross pole 86 at a diagonal angle with respect to the frame 40 and table top 12.

As discussed above, the retaining assembly 36 generally provides structural support to the center of the table top 12 of the utility table 310. It will be further appreciated that with the distal ends 328, 334 attached contiguous each other in retention to the cross-brace member 36, forces applied to the table top 12 which would ordinarily be transferred through one of the support pivotal braces 324, 330, respectively, into the table top 12 causing it to bow, will substantially be nullified by the counter force provided by the opposing pivotal support brace 324, 330, respectively.

For example, the horizontal component of a force applied by a user at one end of the table top 12 will act upon the one of the support pedestals 18, 20 and, because the distal ends 328, 334 of the pivotal support braces 224, 330, respectively, are attached to the retaining assembly 36, an equal and opposite horizontal force component applied by the other pivotal support brace 18, 20 will cancel out the horizontal force component of the original force. Accordingly, although the support legs 212, 214 of the support pedestals 18, 20 are offset, the structural configuration of the present invention provides increased structural support to the table top 12 with fewer parts. As will be appreciated by those skilled in the art, the retaining assembly 36 may be disposed in a variety of configurations which are consistent with the spirit and scope of the present invention so as to slow the pivotal support braces 324, 330 to supportably interrelate with each other. Moreover, the utility table 210 shown in FIG. 4 and discussed in detail hereinabove, may include support pedestals 18, 20 that comprise spaced apart support legs which are offset from the corresponding support legs of the opposing support pedestal to provide the advantages of overlapping the legs, if desired.

Although certain structural elements and components, such as: (1) telescoping support legs operable to adjust the height of the table top 12 above an underlying surface, (2) a second cross-brace member 36b formed independent of a first cross-brace member 36a (see FIG. 4); (3) a plurality of kiss-offs 158 formed in the mounting surface 14 of the table top 12 (see FIGS. 2 and 3), (4) one or more mounting members 148 for supportably retaining the retaining assembly 36 in relation to the mounting surface 14 of the table top 12 (See FIGS. 2 and 3), (5) one or more securing members 152 attached to the mounting surface 14 of the table top 12 for securing the support pedestals 18, 20 in the collapsed position (see FIGS. 2 and 3); (6) one or more manifolds 154, 156 that assist in facilitating the blow molding process by providing for uniform dispersion of air along the length of the blow-molded table top 12 (see FIGS. 2 and 3); (7) a bend formed in the opposing ends 211 of the support bar 212 (see FIG. 4); (8) beveled edges and/or a textured working surface 16 (See FIG. 1); and (9) a plurality of plateaus 219 and longitudinal trenches 220 may also be formed in the mounting surface 14 to further add stiffening and strength to the table top 12 (see FIG. 4) have been omitted from the embodiment of the utility table 310 illustrated in FIG. 5. It is contemplated herein that one or more of the foregoing structural however, may be incorporated into the design of the utility table 310, if desired.

Many of the problems associated with prior art portable folding utility tables are addressed by the teachings of the present invention. From the above discussion, it will be appreciated that the present invention provides a novel portable folding utility table having a center support assembly that is durable enough to withstand increased wear and tear, yet is lightweight enough to easily set up and take down. The present invention also provides a utility table with a center support retaining assembly that provides increased stability and structural integrity with an efficient design that allows the interrelation of the support pedestals to each other. The center support retaining assembly of the utility table of the present invention is also cost effective to manufacture and does not compromise the structural integrity of the table top. The present invention also provides a portable folding utility table that includes a work surface disposed at a height that is comfortable to work at Additionally, features are provided to improve the functionality of longer and smaller tables under various use and loading conditions.

It should be appreciated that the apparatus of the present invention is capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A table comprising:
  a table top constructed from blow-molded plastic, the table top including an upper portion, a lower portion and a hollow interior portion that is formed during the blow-molding process;
  a lip integrally formed with the table top as part of a unitary, one-piece construction, the lip including a hollow interior portion that is formed during the blow-molding process, the lip comprising:
    a first portion disposed towards a first side of the table top, the first portion including an inner portion, an outer portion and a lower portion; and
    a second portion disposed towards a second side of the table top, the second portion including an inner portion, an outer portion and a lower portion;
  a metal frame connected to the lower portion of the table top, the frame comprising:
    a first portion connected to the inner portion of the first portion of the lip by a plurality of fasteners; and
    a second portion connected to the inner portion of the second portion of the lip by a plurality of fasteners;
  a first leg assembly selectively movable between an extended position and a collapsed position relative to the table top;
  a second leg assembly selectively movable between an extended position and a collapsed position relative to the table top;
  a first support brace connected to the first leg assembly, the first support brace being sized and configured to support the first leg assembly when the first leg assembly is in the extended position;
  a second support brace connected to the second leg assembly, the second support brace being sized and configured to support the second leg assembly when the second leg assembly is in the extended position; and
  a cross member connected to the first portion of the frame and a second portion of the frame, the cross member being generally centrally disposed between the first leg assembly and the second leg assembly;
  wherein the first leg assembly is generally disposed between the inner portion of the first portion of the lip and the inner portion of the second portion of the lip when the first leg assembly is in the collapsed position to facilitate stacking of the table;
  wherein the second leg assembly is generally disposed between the inner portion of the first portion of the lip and the inner portion of the second portion of the lip when the second leg assembly is in the collapsed position to facilitate stacking of the table;
  wherein the first leg assembly generally does not extend beyond a plane that is generally aligned with the lower portion of the first portion of the lip and the lower portion of the second portion of the lip when the first leg assembly is in the collapsed position to facilitate stacking of the table; and
  wherein the second leg assembly generally does not extend beyond a plane that is generally aligned with the lower portion of the first portion of the lip and the lower portion of the second portion of the lip when the second leg assembly is in the collapsed position to facilitate stacking of the table.

2. The table as in claim 1, wherein the cross member includes a first end that is disposed within an aperture in the first portion of the frame and a second end that is disposed within an aperture in the second portion of the frame.

3. The table as in claim 1, wherein the first leg assembly includes an elongated member that is pivotally connected to the frame and the second leg assembly including an elongated member that is pivotally connected to the frame; and
  wherein the elongated member of the first leg assembly, the elongated member of the second leg assembly and the cross member are disposed substantially parallel to each other and in a spaced-apart relationship.

4. The table as in claim 1, wherein the plurality of fasteners that connect the first portion of the frame to the inner portion of the first portion of the lip penetrate both a portion of the frame and a corresponding inner portion of the lip; and
  wherein the plurality of fasteners that connect the second portion of the frame to the inner portion of the second portion of the lip penetrate both a portion of the frame and a corresponding inner portion of the lip.

5. The table as in claim 1, wherein the first leg assembly includes a pair of substantially parallel support members that are connected by a connecting member; and
  wherein the second leg assembly includes a pair of substantially parallel support members that are connected by a connecting member.

6. The table as in claim 5, wherein the first support brace includes a bifurcated end to facilitate attachment to the pair of substantially parallel support members of the first leg assembly; and wherein the second support brace includes a bifurcated end to facilitate attachment to the pair of substantially parallel support members of the second leg assembly.

7. The table as in claim 1, further comprising a groove that is integrally formed in the lower portion of the table top during the blow-molding process, at least a portion of the cross member being disposed in the groove.

8. The table as in claim 1, wherein the first portion of the frame is attached to only the inner portion of the first portion of the lip by the plurality of fasteners and the first portion of the frame is not attached to any other portion of the table top; and wherein the second portion of the frame is attached to only the inner portion of the second portion of the lip by the plurality of fasteners and the second portion of the frame is not attached to any other portion of the table top.

9. The table as in claim 1, wherein the first leg assembly is positioned within an envelope generally defined by the inner portion of the first portion of the lip, the lower portion of the table top, the inner portion of the second portion of the lip and a plane that is generally aligned with the lower portion of the first portion of the lip and the lower portion of the second portion of the lip when the first leg assembly is in the collapsed position; and wherein the second leg assembly is positioned within an envelope generally defined by the inner portion of the first portion of the lip, the lower portion of the table top, the inner portion of the second portion of the lip and a plane that is generally aligned with the lower portion of the first portion of the lip and the lower portion of the second portion of the lip when the second leg assembly is in the collapsed position.

10. The table as in claim 1, wherein the outer portion of the first portion of the lip is generally aligned with an outer edge on the first side of the table top; and wherein the outer portion of the second portion of the lip is generally aligned with an outer edge on the second side of the table top.

11. A table comprising:

a table top constructed from blow-molded plastic, the table top including an upper portion, a lower portion and a hollow interior portion that is formed during the blow-molding process;

a first portion of a lip that is integrally formed with the table top as part of a unitary, one-piece construction, the first portion of the lip including a hollow interior portion that is formed during the blow-molding process, the first portion of the lip including an outer portion that is disposed towards a first side of the table top, an inner portion and a lower portion;

a second portion of a lip that is integrally formed with the table top as part of a unitary, one-piece construction, the second portion of the lip including a hollow interior portion that is formed during the blow-molding process, the second portion of the lip including an outer portion that is disposed towards a second side of the table top, an inner portion and a lower portion;

a metal frame connected to the lower portion of the table top, the frame comprising:

a first portion connected to the inner portion of the first portion of the lip by a plurality of fasteners; and a second portion connected to the inner portion of the second portion of the lip by a plurality of fasteners;

a first leg assembly selectively movable between an extended position and a collapsed position relative to the table top;

a second leg assembly selectively movable between an extended position and a collapsed position relative to the table top;

a first support brace connected to the first leg assembly, the first support brace being sized and configured to support the first leg assembly when the first leg assembly is in the extended position;

a second support brace connected to the second leg assembly, the second support brace being sized and configured to support the second leg assembly when the second leg assembly is in the extended position; and a cross member connected to the first portion of the frame and a second portion of the frame, the cross member being generally centrally disposed between the first leg assembly and the second leg assembly;

wherein the first leg assembly is generally disposed between the inner portion of the first portion of the lip and the inner portion of the second portion of the lip when the first leg assembly is in the collapsed position to facilitate stacking of the table;

wherein the second leg assembly is generally disposed between the inner portion of the first portion of the lip and the inner portion of the second portion of the lip when the second leg assembly is in the collapsed position to facilitate stacking of the table;

wherein the first leg assembly generally does not extend beyond a plane that is generally aligned with the lower portion of the first portion of the lip and the lower portion of the second portion of the lip when the first leg assembly is in the collapsed position to facilitate stacking of the table; and wherein the second leg assembly generally does not extend beyond a plane that is generally aligned with the lower portion of the first portion of the lip and the lower portion of the second portion of the lip when the second leg assembly is in the collapsed position to facilitate stacking of the table.

12. The table as in claim 11, wherein the cross member includes a first end that is disposed within an aperture in the first portion of the frame and a second end that is disposed within an aperture in the second portion of the frame.

13. The table as in claim 11, wherein the first leg assembly includes an elongated member that is pivotally connected to the frame and the second leg assembly including an elongated member that is pivotally connected to the frame; and wherein the elongated member of the first leg assembly, the elongated member of the second leg assembly and the cross member are disposed substantially parallel to each other and in a spaced-apart relationship.

14. The table as in claim 11, wherein the plurality of fasteners that connect the first portion of the frame to the inner portion of the first portion of the lip penetrate both a portion of the frame and a corresponding inner portion of the lip; and wherein the plurality of fasteners that connect the second portion of the frame to the inner portion of the second portion of the lip penetrate both a portion of the frame and a corresponding inner portion of the lip.

15. The table as in claim 11, wherein the first leg assembly includes a pair of substantially parallel support members that are connected by a connecting member; and wherein the second leg assembly includes a pair of substantially parallel support members that are connected by a connecting member.

16. The table as in claim 15, wherein the first support brace includes a bifurcated end to facilitate attachment to the pair of substantially parallel support members of the first leg assembly; and wherein the second support brace includes a bifurcated end to facilitate attachment to the pair of substantially parallel support members of the second leg assembly.

17. The table as in claim 11, further comprising a groove that is integrally formed in the lower portion of the table top during the blow-molding process, at least a portion of the cross member being disposed in the groove.

18. The table as in claim 11, wherein the first portion of the frame is attached to only the inner portion of the first portion of the lip by the plurality of fasteners and the first portion of the frame is not attached to any other portion of the table top; and wherein the second portion of the frame is attached to only the inner portion of the second portion of the lip by the plurality of fasteners and the second portion of the frame is not attached to any other portion of the table top.

19. The table as in claim 11, wherein the first leg assembly is positioned within an envelope generally defined by the inner portion of the first portion of the lip, the lower portion of the table top, the inner portion of the second portion of the lip and a plane that is generally aligned with the lower portion of the first portion of the lip and the lower portion of the second portion of the lip when the first leg assembly is in the collapsed position; and wherein the second leg assembly is positioned within an envelope generally defined by the inner portion of the first portion of the lip, the lower portion of the table top, the inner portion of the second portion of the lip and a plane that is generally aligned with the lower portion of the first portion of the lip and the lower portion of the second portion of the lip when the second leg assembly is in the collapsed position.

20. The table as in claim 11, wherein the outer portion of the first portion of the lip is generally aligned with an outer edge on the first side of the table top; and wherein the outer portion of the second portion of the lip is generally aligned with an outer edge on the second side of the table top.

21. A table comprising:

a table top constructed from blow-molded plastic, the table top including an upper portion, a lower portion and a hollow interior portion that is formed during the blow-molding process;

one or more frame mounting portions extending downwardly relative to the lower portion of the table top, the frame mounting portions being integrally formed with the table top as part of a unitary, one-piece construction, the frame mounting portions including a hollow interior portion that is formed during the blow-molding process, the frame mounting portions comprising:

a first portion disposed towards a first side of the table top;

a second portion disposed towards a second side of the table top; and a lower portion;

a metal frame connected to at least one of the frame mounting portions by one or more fasteners;

a first leg assembly selectively movable between an extended position and a collapsed position relative to the table top;

a second leg assembly selectively movable between an extended position and a collapsed position relative to the table top;

a first support brace connected to the first leg assembly, the first support brace being sized and configured to support the first leg assembly when the first leg assembly is in the extended position;

a second support brace connected to the second leg assembly, the second support brace being sized and configured to support the second leg assembly when the second leg assembly is in the extended position; and at least one cross member connected to the frame, the first support brace being connected to the at least one cross member and the first leg assembly, the second support brace being connected to the at least cross member and the second leg assembly;

wherein the first leg assembly is generally disposed between portions of the frame when the first leg assembly is in the collapsed position to facilitate stacking of the table;

wherein the second leg assembly is generally disposed portions of the frame when the second leg assembly is in the collapsed position to facilitate stacking of the table;

wherein the first leg assembly is at least substantially disposed between a plane that is generally aligned with the lower portion of at least one of the frame mounting portions and a plane that is generally aligned with the lower portion of the table top when the first leg assembly is in the collapsed position to facilitate stacking of the table; and wherein the second leg assembly is at least substantially disposed between the plane that is generally aligned with the lower portion of at least one of the frame mounting portions and the plane that is generally aligned with the lower portion of the table top leg when the second leg assembly is in the collapsed position to facilitate stacking of the table.

22. The table as in claim 21, wherein the at least one cross member includes a first cross member and a second cross member, the first support brace being connected to the first cross member and the first leg assembly, the second support brace being connected to the second cross member and the second leg assembly.

23. The table as in claim 21, wherein the first leg assembly includes an elongated member that is pivotally connected to the frame and the second leg assembly including an elongated member that is pivotally connected to the frame; and wherein the elongated member of the first leg assembly, the elongated member of the second leg assembly and the at least one cross member are disposed substantially parallel to each other and in a spaced-apart relationship.

24. The table as in claim 21, wherein the one or more fasteners that connect the frame to the frame mounting portions penetrate both the frame and at least an outer surface of the frame mounting portions.

25. The table as in claim 21, wherein the first leg assembly includes a pair of substantially parallel support members that are connected by a connecting member; and wherein the second leg assembly includes a pair of substantially parallel support members that are connected by a connecting member.

26. The table as in claim 25, wherein the first support brace includes a bifurcated end to facilitate attachment to the pair of substantially parallel support members of the first leg assembly; and wherein the second support brace includes a bifurcated end to facilitate attachment to the pair of substantially parallel support members of the second leg assembly.

27. The table as in claim 21, further comprising a groove that is integrally formed in the lower portion of the table top during the blow-molding process, at least a portion of the cross member being disposed in the groove.

28. The table as in claim 21, wherein the frame is attached only to the frame mounting portions by the one or more fasteners and the frame is not attached by the fasteners to any other portion of the table top.

29. The table as in claim 21, wherein the first leg assembly is positioned within an envelope generally defined by the frame mounting portions, the lower portion of the table top and a plane that is generally aligned with the lower portion of the frame mounting portions when the first leg assembly is in the collapsed position; and wherein the second leg assembly is positioned within an envelope generally defined by the frame mounting portions, the lower portion of the table top and the plane that is generally aligned with the lower portion of the frame mounting portions when the second leg assembly is in the collapsed position.

30. The table as in claim 21, wherein an outer portion of the frame mounting portions is generally aligned with an outer edge of the table top.

* * * * *

UNITED STATES PATENT AND TRADEMARK OFFICE
CERTIFICATE OF CORRECTION

| | | |
|---|---|---|
| PATENT NO. | : 7,299,755 B2 | Page 1 of 1 |
| APPLICATION NO. | : 11/433994 | |
| DATED | : November 27, 2007 | |
| INVENTOR(S) | : Carl R. Stanford | |

It is certified that error appears in the above-identified patent and that said Letters Patent is hereby corrected as shown below:

Title Page
Page 4, add the reference:
--All-Luminum Products, Inc., Gimbels, Folding Drop-Leaf Table 36" x 72", 1 page--

Drawings
Sheet 2, FIG. 2, change reference "110" to --46-- and change reference "68" to --68a--

Column 7
Line 14, change "table 10 For" to --table 10. For--

Column 8
Line 1, change "110 frame" to --a frame--

Column 14
Line 51, change "18 20" to --18, 20--

Column 15
Line 27, change "1124" to --124--

Column 17
Line 21, change "(generally" to --generally--
Line 36, change "36 As" to --36. As--
Line 48, change "314. 312" to --314, 312--

Signed and Sealed this

Sixteenth Day of March, 2010

David J. Kappos
*Director of the United States Patent and Trademark Office*